US006988922B2

(12) United States Patent
Iwaki

(10) Patent No.: US 6,988,922 B2
(45) Date of Patent: Jan. 24, 2006

(54) METHODS OF MANUFACTURING ELECTRON-EMITTING DEVICE, ELECTRON SOURCE, AND IMAGE FORMING APPARATUS

(75) Inventor: Takashi Iwaki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 287 days.

(21) Appl. No.: 10/260,557

(22) Filed: Oct. 1, 2002

(65) Prior Publication Data

US 2003/0073371 A1 Apr. 17, 2003

(30) Foreign Application Priority Data

Oct. 11, 2001 (JP) ........................................ 2001-313540
Sep. 5, 2002 (JP) ........................................ 2002-259614

(51) Int. Cl.
*H01J 9/00* (2006.01)

(52) U.S. Cl. ................................................ 445/6; 445/24

(58) Field of Classification Search .................... 445/24, 445/25, 50, 51
See application file for complete search history.

(56) References Cited

U.S. PATENT DOCUMENTS

| | | | | |
|---|---|---|---|---|
| 6,123,876 | A | 9/2000 | Kobayashi et al. | 252/519.2 |
| 6,221,426 | B1 | 4/2001 | Yamanobe | 427/77 |
| 6,334,803 | B1 | 1/2002 | Shibata | 445/51 |
| 6,383,047 | B1 | 5/2002 | Minami et al. | 445/6 |
| 6,492,769 | B1 | 12/2002 | Oda et al. | 313/495 |
| 6,781,667 | B2 | 8/2004 | Horiguchi et al. | |
| 2002/0081931 | A1 | 6/2002 | Iwaki et al. | |
| 2002/0117670 | A1 | 8/2002 | Horiguchi et al. | 257/59 |
| 2003/0039767 | A1 | 2/2003 | Mizuno et al. | 427/595 |
| 2003/0160180 | A1 | 8/2003 | Arai et al. | 250/424 |
| 2003/0161942 | A1 | 8/2003 | Arai et al. | 427/77 |
| 2003/0162464 | A1 | 8/2003 | Kyogaku et al. | 445/24 |
| 2003/0162465 | A1 | 8/2003 | Mizuno et al. | 445/24 |
| 2003/0162467 | A1 | 8/2003 | Shimazu et al. | 445/50 |

FOREIGN PATENT DOCUMENTS

| | | |
|---|---|---|
| EP | 0 736890 A1 | 10/1996 |
| EP | 0788130 A2 | 8/1997 |
| EP | 0 803 890 A1 | 10/1997 |
| EP | 0986085 A2 | 3/2000 |
| EP | 1 184 886 A1 | 3/2002 |
| JP | 7-65704 | 3/1995 |
| JP | 8-55563 | 2/1996 |
| JP | 8-321254 | 12/1996 |
| JP | 9-161666 | 6/1997 |
| JP | 9-237571 | 9/1997 |
| JP | 11-120901 | 4/1999 |
| KR | 2000-0058133 | 9/2000 |

OTHER PUBLICATIONS

Baba et al., "Field Emission from an Ion–Beam–Modified Polyimide Film," Jpn. J. Appl. Phys., V. 38, pp. L261–L263 (1999), no month.
U.S. Appl. No. 09/506,289, filed Feb. 18, 2000.

*Primary Examiner*—Joseph Williams
(74) *Attorney, Agent, or Firm*—Fitzpatrick, Cella, Harper & Scinto

(57) ABSTRACT

A method of manufacturing an image forming apparatus is provided for increasing the uniformity of an electron-emitting device, improving the electron-emitting characteristics, and permitting the manufacture of an image forming apparatus having an excellent display quality to be retained for a long time. The image forming apparatus is manufactured by forming a plurality of pairs of electrodes (2, 3) on a first substrate (1), forming a polymer film containing a photosensitive material such that the polymer film makes a connection between the electrodes (2, 3), patterning the polymer film into a desired configuration by the irradiation of light, lowering the resistance of the patterned polymer film to form a conductive film (6'), and forming a gap (5') in a part of the conductive film (6') by the flow of a current between the electrodes (2, 3). Subsequently, the first substrate 1 and the second substrate on which an image forming member is disposed are connected through a joining member under a reduced pressure atmosphere to construct an image forming apparatus.

13 Claims, 14 Drawing Sheets

METHODS OF MANUFACTURING ELECTRON-EMITTING DEVICE, ELECTRON SOURCE, AND IMAGE FORMING APPARATUS

BACKGROUND OF THE INVENTION

1. Field of the Invention

The present invention relates to a method of manufacturing an electron-emitting device. Also, the present invention relates to a method of manufacturing an electron source structured by arranging a plurality of electron-emitting devices. Furthermore, the present invention relates to a method of manufacturing an image forming apparatus such as a display apparatus having a structure that uses the electron source.

2. Related Background Art

Up to now, a surface conduction electron-emitting device has been known as an electron-emitting device. A structure of such a surface conduction electron-emitting device and a method of manufacturing such a device are disclosed, for example, in Japanese Patent Application Laid-Open No. 8-321254.

A typical surface conduction electron-emitting device such as one disclosed in the above-mentioned publication is schematically shown in FIGS. 14A and 14B which are a plan view and a sectional side view of the surface conduction electron-emitting device, respectively, as disclosed in the above publication or the like.

In FIGS. 14A and 14B, reference numeral 1 denotes a substrate, 2 and 3 denote a pair of electrodes (device electrodes) facing each other, 4 denotes a conductive film, 5 denotes a second gap, 6 denotes a carbon film, and 7 denotes a first gap.

An example of manufacturing the electron-emitting device constructed as in FIGS. 14A and 14B is schematically illustrated in FIGS. 15A to 15D.

A pair of electrodes 2 and 3 are first formed on a substrate 1 (FIG. 15A), followed by forming a conductive film 4 for connecting between the electrodes 2 and 3 (FIG. 15B). Then, an electric current is fed between the electrodes 2 and 3 and the so-called "a forming step" is performed for forming a second gap 5 in a part of the conductive film 4 (FIG. 15C). Subsequently, in a carbon compound atmosphere, a voltage is applied between the electrodes 2 and 3 to perform the so-called "an activation step" by which a carbon film 6 is formed on a part of the substrate 1 within the area of a second gap 5 and is also formed on a part of the conductive film 4 adjacent to the second gap 5, resulting in an electron-emitting device (FIG. 15D).

On the other hand, another method of manufacturing a surface conduction electron-emitting device is disclosed in Japanese Patent Application No. 9-237571. As a substitute for "the activation step" described above, the method includes the steps of depositing a film of an organic substance such as thermosetting resin, electron beam negative resist, or polyacrylonitrile on a conductive film and carbonizing the organic substance.

Conventionally, an image forming device such as a flat panel display can be constructed by combining an electron source comprised of a plurality of electron-emitting devices manufactured by the above method with an image forming member comprised of a fluorescent substance.

SUMMARY OF THE INVENTION

However, "the activation step" and other steps are performed in addition to "the forming step" in the conventional device as described above, so that in the second gap 5 formed through the "the forming step", there is arranged a carbon film 6 made of carbon or a carbon composition having a first gap 7, which is narrower that the second gap 5. Accordingly, measures are taken to obtain excellent electron-emitting characteristics.

However, the method of manufacturing the image forming apparatus using the conventional electron-emitting devices has the following problems.

That is, the conventional method included many additional steps in each step, for example multiple electrification steps in "the forming step" and "the activation step" and the additional step of forming an appropriate atmosphere in each step, so that process control would be complicated.

In addition, when the above electron-emitting device is used in an image forming apparatus such as a display, more improvements in electron emission characteristics are required for the reduction of power consumption.

Furthermore, it is also required to manufacture the image forming apparatus using the above electron-emitting device more easily and at lower cost.

For solving the above problems, an object of the present invention is to provide a method of manufacturing an electron-emitting device, especially permitting the simplified steps for the manufacture of an electron-emitting device and also permitting improvements in electron-emitting characteristics, a method of manufacturing an electron source, and a method of manufacturing an image forming apparatus.

The present invention has been made as a result of extensive studies for solving the above-mentioned problems and therefore the present invention has the following configuration.

Therefore, according to the present invention, there is provided a method of manufacturing an electron-emitting device, composed by the steps of:

forming a pair of electrodes on a substrate;

forming a polymer film containing a photosensitive material such that the polymer film makes a connection between the electrodes;

patterning the polymer film containing the photosensitive material into a desired configuration by using a light;

processing the resistance of the patterned polymer film to obtain a resistance-lowered film; and forming a gap in the resistance-lowered film.

In embodiments of the present invention: the polymer film containing the photosensitive material is a negative-type or a positive-type photosensitive polymer film; the step of patterning using the light is performed by exposing a desired area of the negative-type photosensitive polymer film to the light and then removing an unexposed area of the negative-type photosensitive polymer film, or by exposing an area other than a desired area of the positive-type photosensitive polymer film to the light and then removing the exposed area of the positive-type photosensitive polymer film; the patterned polymer film is a polyimide film; the step of lowering the resistance of the polymer film includes the step of irradiating light on the patterned polymer film or the step of irradiating electron beam on the patterned polymer film; the step of lowering the resistance of the polymer film includes the step of irradiating ion beam on the patterned polymer film or the step of heating the patterned polymer film; and the step of forming a gap in the resistance-lowered film is performed by allowing a current to flow through at least a part of the resistance-lowered film.

A plurality of electron-emitting devices are manufactured in accordance with the above-mentioned method, thereby constituting one electron source. The electron source and an image forming apparatus constitute the image forming apparatus of the present invention.

According to the present invention, a polymer film including a photosensitive material is patterned using light, so that a uniform polymer films that disposed in a large area can be obtained. Therefore, the uniformity of each electron-emitting device is also increased, so that improvements in electron-emitting characteristics of such a device can be attained.

In other words, the polymer film including the photosensitive material is patterned using light to form one having a desired shape and a desired film thickness, and the uniformed polymer film thus obtained is irradiated with light, laser beam, or the like. Therefore, the resistance of the polymer film can be uniformly and appropriately lowered.

According to the present invention, furthermore, for forming a narrow gap having excellent electron-emitting characteristics, the steps of forming an atmosphere including an organic material, forming the polymer film on a conductive film with accuracy, and so on can be omitted, so that the manufacturing process can be simplified.

DETAILED DESCRIPTION OF THE PREFERRED EMBODIMENTS

Hereinafter, description will made of preferred embodiments of the present invention. However, the present invention is not limited to these embodiments.

Figure 17:
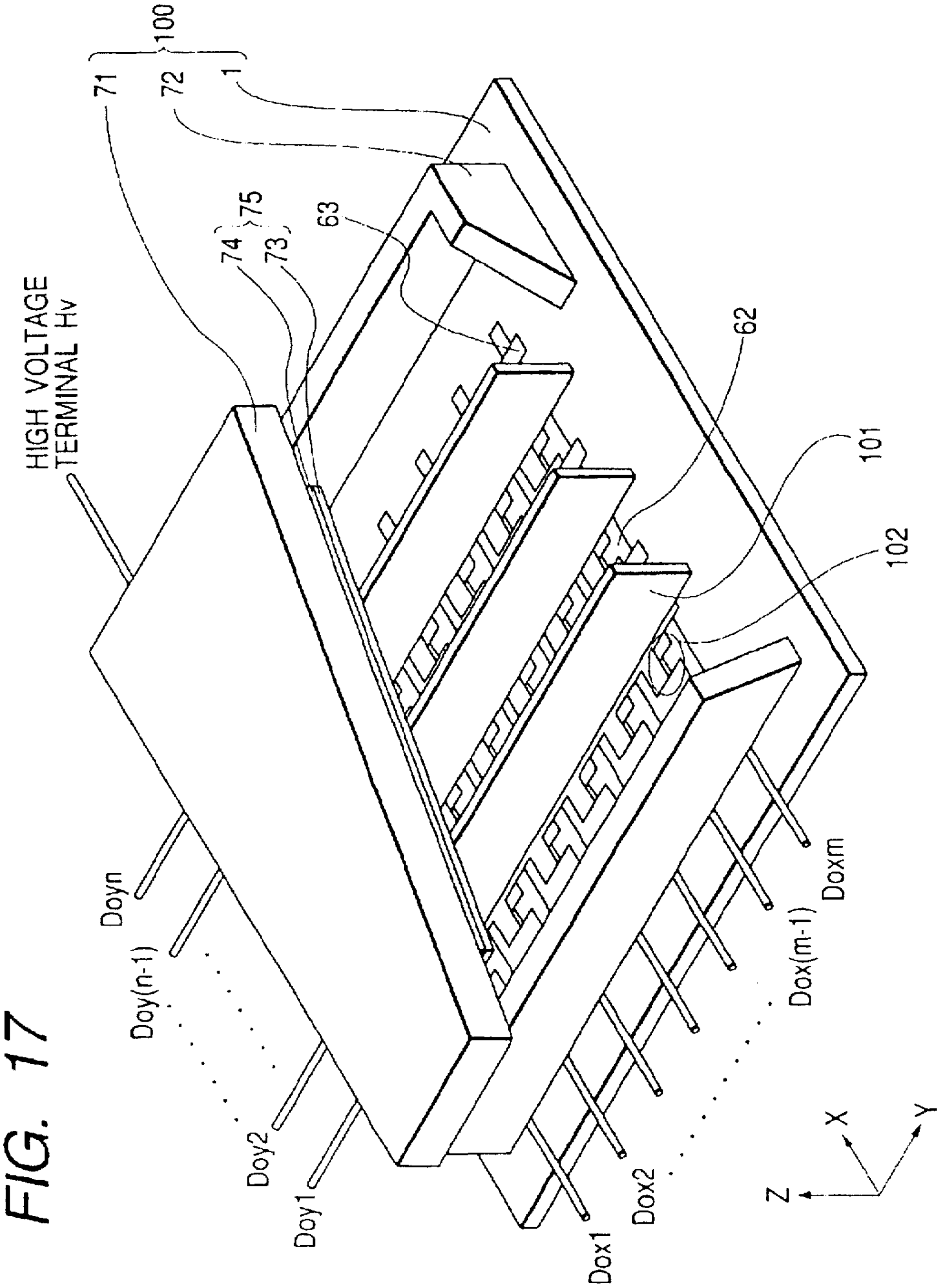
FIG. 17 is a perspective view schematically illustrating an example of an image forming apparatus according to the present invention.

FIG. 17 is a perspective view schematically illustrating an image forming apparatus using electron-emitting devices 102 prepared by a manufacturing method according to the present invention. In FIG. 17, furthermore, a part of a supporting frame 72 and a part of a face plate 71, which will be described below, are removed for illustrating the inside of the image forming apparatus (an airtight container 100).

In FIG. 17, reference numeral 1 denotes a rear plate provided as an electron source substrate on which a plurality of electron-emitting devices 102 are disposed, 71 denotes a face plate on which an image forming member 75 is mounted, 72 denotes a supporting frame for retaining a space between the face plate 71 and the rear plate 1 under a reduced pressure, and 101 denotes a spacer for retaining a space between the face plate 71 and the rear plate 1.

If the image forming apparatus 100 is a display, the image forming member 75 comprises a phosphor film 74 and a conductive film 73 such as a metalback. Reference numerals 62 and 63 denote wirings for applying voltages on respective electron-emitting devices 102, respectively. In the figure, Doy1 to Doyn and Dox1 to Doxm denote output wirings for connecting between a drive circuit or the like arranged on the outside of the image forming apparatus 100 and the ends of the wirings 62 and 63 guided from a decompressed space (a space surrounded by the face plate, the rear plate, and the supporting frame) of the image forming apparatus to the outside.

Figure 1A:
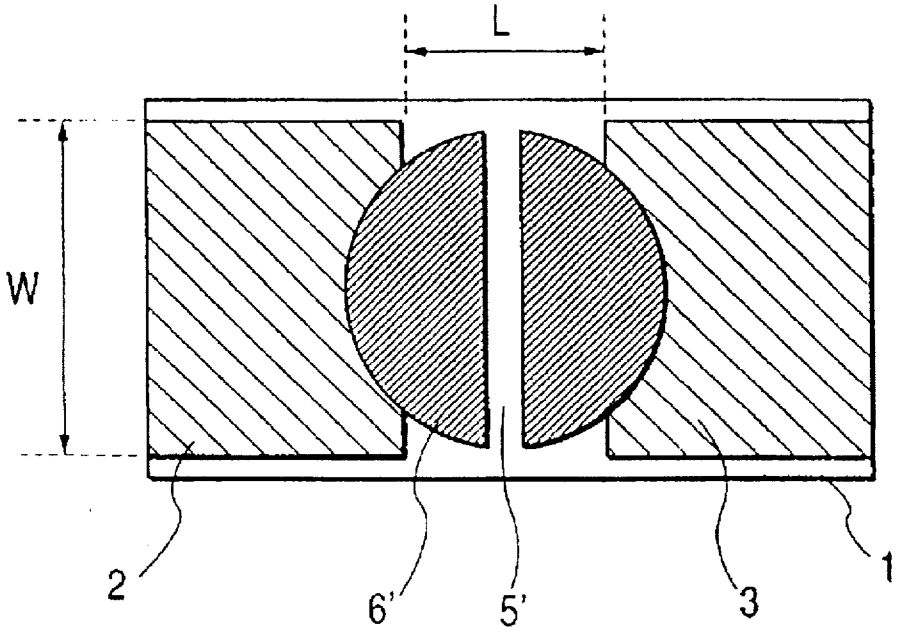
FIGS. 1A and 1B are a plan view (1A) and a sectional side view (1B) schematically illustrating an example of an electron-emitting device according to the present invention.
Figure 1B:
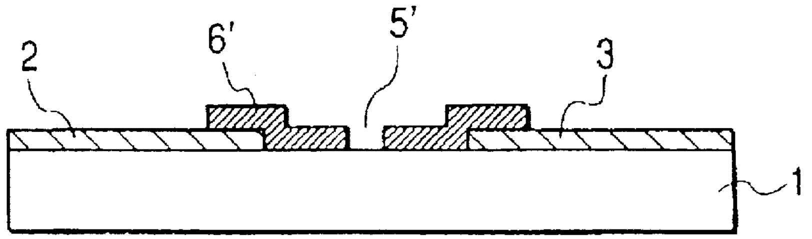

Referring now to FIGS. 1A and 1B, an example of the electron-emitting device 102 of the present invention is illustrated in more detail. Here, FIG. 1A is a plan view and FIG. 1B is a sectional side view of the electron-emitting device 102.

In FIGS. 1A and 1B, reference numeral 1 denotes a substrate (a rear plate), 2 and 3 denote respective electrodes (device electrodes), 6' denotes an electrically conductive film containing carbon as a main ingredient (a carbon film), and 5' denotes a gap. In addition, the conductive film 6', containing carbon as a main ingredient, is arranged on the substrate 1 between the electrodes 2 and 3. Furthermore, the conductive film 6' covers part of the electrodes 2 and 3 to make a definite connection with the respective electrodes 2 and 3.

The above conductive film 6' may be alternatively referred to as "a carbon film (i.e., an electrically conductive film containing carbon as a main ingredient) having a gap in part thereof, which is responsible for making an electrical connection between a pair of electrodes". In addition, it may be alternatively referred to as "a pair of carbon films (i.e., a pair of electrically conductive films containing carbon as a main ingredient)".

In the electron-emitting device constructed as described above, electrons can be tunneling the gap 5' when a sufficient electric field is applied in the gap 5', then an electric current flows between the electrodes 2 and 3. A part of the tunnel electrons becomes emission current by means of scattering.

Therefore, even if the conductive film 6' does not have an electrical conductivity over the full length and full width thereof, at least a part thereof may have its own electrical conductivity. If such a conductive film 6' is made of an insulating material, electrons cannot be emitted because a sufficient electric field cannot be placed on the gap 5' even though a potential difference is placed between the electrodes 2 and 3. Thus, the conductive film 6' has an electric conductivity at least at a region between the electrode 2 (and the electrode 3) and the gap 5', allowing the gap 5' to have a sufficient electric field.

FIGS. 2A to 2D and 3A to 3C illustrate an example of the method of manufacturing an electron-emitting device according to the present invention. Hereinafter, description will be made of such a method with reference to these figures as well as FIGS. 1A and 1B.

Figure 2A:
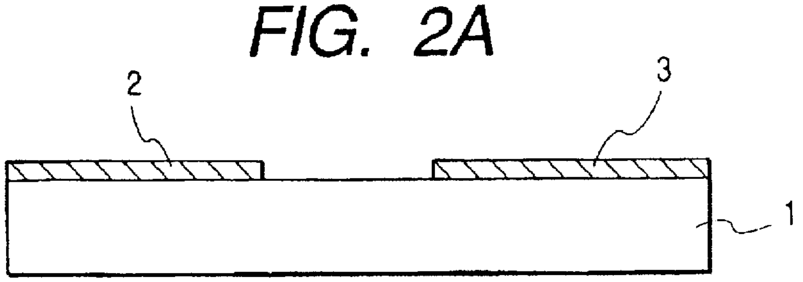
FIGS. 2A, 2B, 2C and 2D are sectional side views schematically illustrating an example of the method of manufacturing the electron-emitting device according to the present invention.

(1) A base plate (a substrate) 1 made of glass or the like is sufficiently washed with detergent, pure water, organic solvent, and so on. Then, an electrode material is deposited on the surface of the cleaned substrate 1 by means of a vacuum deposition, a sputter deposition, or the like, followed by forming electrodes 2 and 3 on the substrate 1 using a photolithography or the like (FIG. 2A). Preferably, as described above, the substrate 1 may be made of a glass such as a silica glass, a laminated glass in which a $SiO_2$ layer is laminated on a soda-lime glass, or a glass in which the amount of an alkali metal such as Na is reduced. Here, the electrode material may be an oxide conductive material, which is a transparent conductive material, such as a film of tin oxide and indium oxide (ITO) if required, for example when the process of laser irradiation is performed as described later. In general, however, any metallic material typically used in the art is used.

Figure 2B:
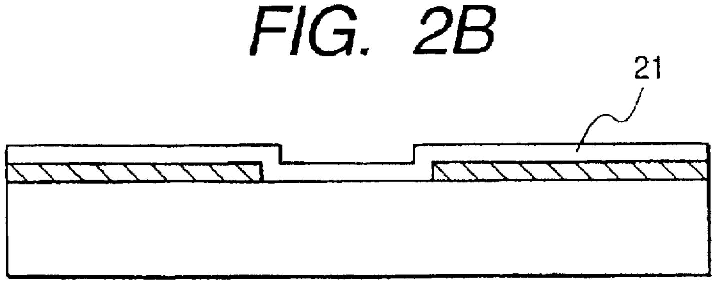

(2) A polymer film 21 is formed on the substrate 1 on which the electrodes 2 and 3 has formed to make a connection between these electrodes 2 and 3 (FIG. 2B). Preferably, the polymer film 21 may be a polyimide film.

The process for preparing the polymer film is one of various methods well-known in the art including spin coating, printing, dipping, splaying, and so on.

Concretely, for instance, a polyimide precursor solution 21 containing a photosensitive material is applied on the surface of the substrate 1 by means of a spin coating method. A solvent for solving the polymer precursor may be selected from N-methyl-2-pyrrolidone, N,N-dimethyl acetamide, N,N-dimethyl formamide, dimethyl sulfoxide, and so on. In addition, n-butyl cellosolve, triethanolamine, or the like may be additionally used in combination with such a solvent. However, it is not limited to a specific one and the solvent is not limited to one of those listed above. Subsequently, the substrate is pre-baked for removing the solvent. The pre-bake may be performed at a temperature of 100° C. or less depending on the kind of the photosensitive material used.

Figure 2C:
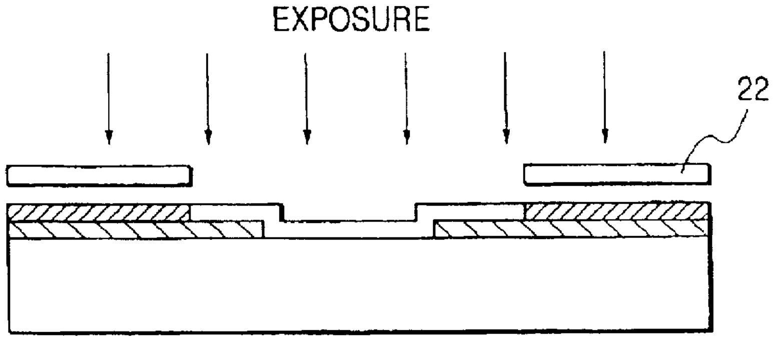
Figure 2D:
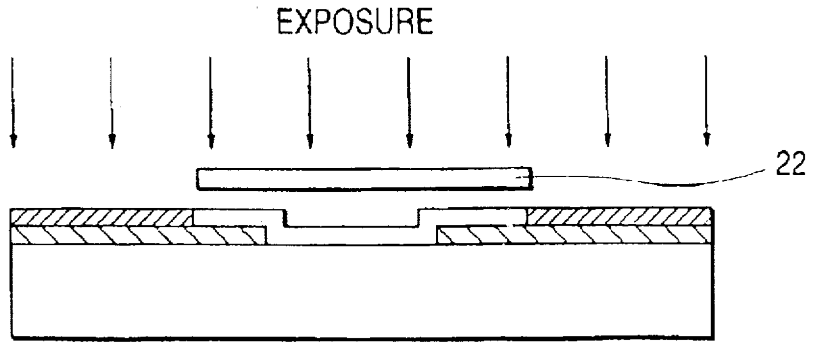
Figure 3A:
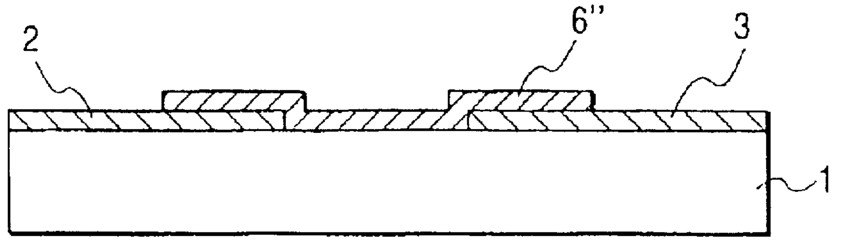
FIGS. 3A, 3B and 3C are sectional side views schematically illustrating an example of the method of manufacturing the electron-emitting device according to the present invention.

Next, light is irradiated on the substrate through a photo mask 22 (FIG. 2C or FIG. 2D). Here, the photo mask 22 is previously prepared to provide a polyimide film (i.e., a polymer film 6") with a predetermined pattern for making a connection between the electrodes 2 and 3. In FIG. 2C, there is shown an example of a negative mask of photosensitive polymer. In FIG. 2D, on the other hand, there is shown an example of a positive mask of the same. The irradiated light may be of ultraviolet radiation, far-ultraviolet radiation, visible radiation, single wavelength rays (e.g., g-line or i-line), or the like. Alternatively, in stead of using the mask 22, light beams previously formed into a predetermined shape may be irradiated only on a desired area. After the irradiation of light through the mask 22, undesired portions (i.e., areas where the light is not irradiated when the negative mask is used or areas where the light is irradiated when the positive mask is used) are dissolved and removed by a developer to obtain a polymer film 6" having a desired shape (FIG. 3A).

When the negative photosensitive polyimide is used, the developer may be, but not limited to, a mixture of a good solvent such as N-methyl-2-pyrrolidone, N,N-dimethyl acetamide, or N,N-formamide and a poor solvent such as lower alcohol or aromatic hydrocarbon. When the positive photosensitive polyimide is used, the developer may be, but not limited to, an aqueous solution of tetramethylammonium hydroxide or the like may be used. After the development, the substrate 1 is rinsed to remove the developer if required.

In the case of the negative photosensitive polymer, a portion thereof irradiated with light remains as a result of the developing process. In the case of the positive photosensitive polymer, on the other hand, a portion thereof protected from the irradiation of light remains as it is. Therefore, when the electron-emitting device of the present invention is prepared using the negative mask, the area on which the polymer film 6" is to be formed can be hardened, while the undesired polymer on the remaining area can be easily removed by washing or the like.

In the present invention, the negative mask is preferably used because of the following reason. That is, comparing with the positive mask, the undesired residue is unlikely found on the surface of the substrate 1 after the development especially in the case of applying the method of manufacturing the electron-emitting device of the present invention on the method of manufacturing an electron source where a plurality of wirings is used for connections of a number of the electron-emitting devices. In other words, for example, a negative mask (i.e., a negative photosensitive polyimide) is applied on the whole surface of the substrate (see FIG. 9, the details will be described later) 1 on which the electrodes 2 and 3, wirings 62 and 63, and so on are formed, and subsequently in the step of patterning with light irradiation the light is only irradiated on a comparatively flat area (an area where the polymer film is to be formed). In the case of using a positive mask (i.e., a positive photosensitive polyimide), the positive mask applied on the areas except an area where the polymer film is to be formed should be removed, so that there is a need to sufficiently irradiate light on stepped portions of the wirings, for example. Therefore, comparing with the negative mask, the residue can be easily remained after the development when the positive mask is used. On the other hand, when the negative mask is used, there is a small possibility that the residue is found of the surface of the substrate 1 after removing the developer. Thus, it is possible to lowering the possibility that the irradiation of electron beam or laser beam in the subsequent step lowers the resistance of the residue which leads to a leak current between the adjacent electron-emitting devices or between the wirings.

Furthermore, a polyimide pattern obtained by the above development is heated at a temperature of 200° C. to 400° C. such that cyclopolymerization is achieved, resulting in a polyimide film.

Preferably, the polyimide used may be one prepared by converting a polyamic acid obtained from a reaction between an aromatic dianhydride such as pyromellitic dianhydride, benzophenone tetracarbonic dianhydride, biphenyl tetracarbonic dianhydride, naphthalene tetracarbonic dianhydride, or the like and an aromatic diamine compound such as phenylenediamine, diaminophenyl ether, benzophenone diamine, bis(aminophenoxy)biphenyl, 2,2'-bis(4-aminophenyl)propane, 2,2'-bis[aminophenoxy (phenyl)]propane, or the like into an imide form. Furthermore, a photosensitive material is included in such a polyamic acid solution.

The photosensitive material included in the polyimide may be dimerizable or polymerizable C—C double bound or amino group or quaternary salts thereof, for example, (N,N-dialkyl aminoethoxy)acrylates and quaternary ammonium salts thereof, (N,N-dialkylaminoethoxy)methacrylates or quaternary ammonium salts thereof or the like, or those in which bonds are cleaved by partial breakdown with light, or polyamic acid polymerized with diamine after generating dianhydride prior to polymerization and alcohols and esters having photosensitive groups. In addition, the present invention is not only limited to those materials.

A photo-polymerization initiator, a sensitizer, a copolymerization monomer, an adhesive modifier, or the like may be additionally included if required. The photo-polymerization initiator or the sensitizer may be one selected from benzoin ethers, benzyl ketals, acetophenone derivatives, benzophenone derivatives, xanthones, and so on. The copolymerization monomer may be monomaleimides, polymaleimides, or substitution products thereof. Needless to say, the present invention is not limited to these compounds.

In the present invention, the aromatic polyimide is capable of easily expressing an electric conductivity by dissociating the bonding between carbon atoms and recombining thereof at a comparatively low temperature. In other words, the aromatic polyimide is a polymer capable of easily generating a double bond between carbon atoms. Therefore, the aromatic polyimide can be a preferable material for the above polymer film.

(3) Next, the patterned polymer film 6" is subjected to "the resistance-lowering process" by which the resistance of the film 6" can be lowered. "The resistance-lowering process" allows the polymer film 6" to express the electric conductivity and converts the polymer film 6" into the film containing carbon as a main ingredient (the carbon film) 6'. In this step, from the view point of the subsequent step of forming a gap, the resistance-lowering process is performed until the sheet resistance of the polymer film 6" is lowered within the range of $10^3$ Ω/□ to $10^7$ Ω/□. An example of such a process is to lower the resistance of the polymer film 6" by the application of heat. The reason why the resistance of the polymer film 6" is lowered (i.e., the reason of becoming conductive) may be the expression of electric conductivity by dissociating and recombining the bonding between carbon atoms in the polymer film 6".

The "resistance-lowering process" by heat can be attained by heating the polymer constituting the polymer film 6" at a temperature equal to or more than the decomposition temperature. In addition, it is particularly preferable to apply heat on the above polymer film 6" in an anti-oxidative atmosphere, for example in an inert gas atmosphere or in a vacuum.

The aromatic polymer described above, especially aromatic polyimide, has a high heat decomposition temperature, so that it may express a high electric conductivity when it is heated at a temperature above the heat decomposition temperature, typically in the range of 700° C. to 800° C. or more.

However, just as in the present invention, the method of manufacturing the electron-emitting device may be subjected to some type of constraints because it includes the step of entirely heating the substrate using an oven, a hot plate, or the like at a temperature enough to decompose the polymer film 6 in the view of heat resistance of other components (e.g., electrodes and substrates) that constitute the electron-emitting device. Particularly, the substrate 1 is limited to one having a particularly high heat resistance, such as a silica glass or a ceramic substrate. Considering the application to a display panel or the like having a large area, such a substrate 1 may result in an extremely expensive product.

Figure 3B:
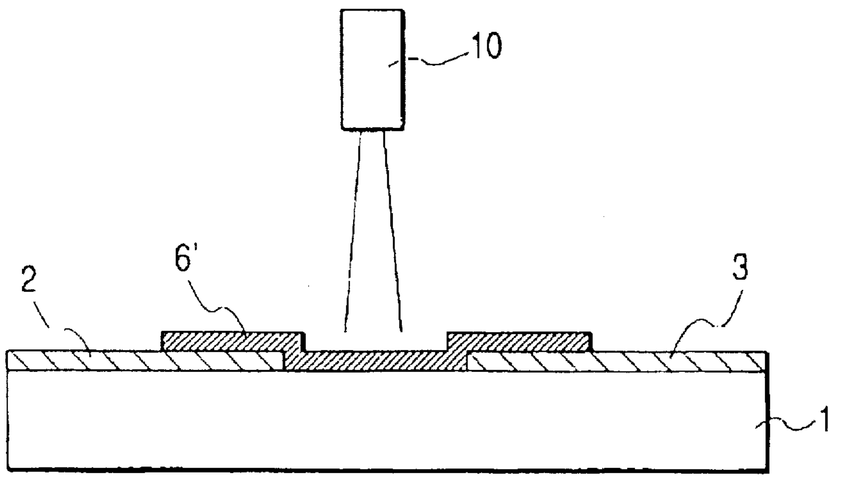

As shown in FIG. 3B, therefore, as a more preferable method of lowering the resistance, the irradiation of electron beam, ion beam, or light to the polymer film 6" is performed. Laser beams or halogen light can be used as the light to be irradiated to the film 6". Particularly, it is preferable to lower the resistance of the polymer film 6" by the irradiation of laser beams from the laser beam irradiating means 10 on the polymer film 6". More preferably, electron beams are irradiated from the electron beam irradiating means 10 to the polymer film 6" to lower the resistance of the polymer film 6". In this way, there is no need to use a specific substrate while lowering the resistance of the polymer film 6". In this case, a more preferable result may be induced based on other factors except heat, such as the decomposition and recombination of carbon atoms in the polymer film 6" by electron beams or photons may be performed in addition to the decomposition and recombination thereof by the application of heat.

Hereinafter, the procedures for the resistance-lowering process will be described.

(For the Irradiation of Electron Beams)

In the case of the irradiation of electron beams, the substrate 1 on which the electrodes 2 and 3 and the polymer film 6" are formed is placed at a position under a decompression atmosphere (i.e., in a vacuum vessel), where an electron gun is equipped. The polymer film 6" is irradiated with electron beam from the electronic gun placed inside the vessel. Preferably, as a condition for irradiating the electron beams at this time, an accelerating voltage (Vac) may be in the range of 0.5 kV to 10 kV. In addition, the irradiation of electron beams may be performed preferably at a current density (Id) in the range of 0.01 mA/mm$^2$ to 1 mA/mm$^2$. In addition, during the irradiation of electron beams, the resistance between the electrodes 2 and 3 may be monitored and the irradiation of electron beams may be terminated when the desired resistance is obtained.

(For the Irradiation of Laser Beams)

In the case of the irradiation of laser beams, the substrate 1 on which the electrodes 2 and 3 and the polymer film 6" are formed is placed on a stage and then laser beams are irradiated on the polymer film 6". At this time, the irradiation of laser beams is generally performed in surroundings that inhibit oxidation (combustion) of the polymer film 6". Thus, it is preferable to perform the irradiation of laser under an inert gas atmosphere or in a vacuum. Depending on the conditions for the irradiation of laser beams, alternatively, it may be performed in the air.

At this time, as a condition for irradiation of laser beams, the irradiation may be preferably performed using a second harmonic wave (a wavelength of 532 nm) of a pulse YAG laser. In addition, during the irradiation of laser beams, the resistance between the electrodes 2 and 3 may be monitored and the irradiation of laser beams may be terminated when the desired resistance is obtained.

As for the irradiation of electron beams or laser beams mentioned above, there is not always need to perform it for the whole polymer film 6". The subsequent steps may be performed even though the resistance of a part of the polymer film 6" is only lowered.

Figure 3C:
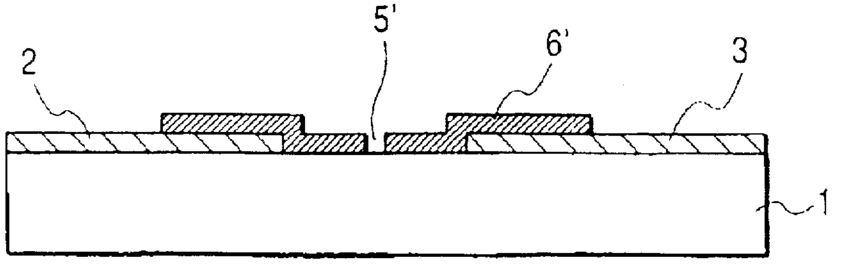

(4) Next, a gap 5' is formed in the conductive film (carbon film) 6' obtained in the previous step (FIG. 3C).

Concretely, the gap 5' can be formed by applying a voltage between the electrodes 2 and 3 (i.e., by flowing an electric current between electrodes). Also, the voltage to be applied may be preferably a pulse voltage. Therefore, the application of voltage forms the gap 5' in a part of the conductive film 6'.

By the way, the application of voltage may be performed concurrently with the above-described resistance-lowering process. That is, voltage pulses are successively applied between the electrodes 2 and 3 while irradiating energy beam (ex. electron beams, light or laser beams). Whatever the case may be, the application of voltage may be advantageously performed under a reduced pressure, preferably under an atmosphere at a pressure of $1.3\times10^{-3}$ Pa or less.

In the above step of voltage application, a current that corresponds to the resistance of the conductive film (carbon film) 6' flows. Therefore, in a state that the resistance of the conductive film (carbon film) 6' is extremely low, in other words, in a state where the lowering of the resistance is excessively progressed, the formation of the gap 5' requires a large amount of electric power. For forming the gap 5' with a comparatively small amount of energy, the progress of lowering the resistance may be adjusted. For this purpose, it is most preferable that the resistance-lowering process may be performed over the whole area of the polymer film 6" in a uniform manner. Alternatively, it is possible to address this problem by performing the resistance-lowering process only on a part of the polymer film 6".

Additionally considering the fact in which the electron-emitting device of the present invention is driven in a vacuum atmosphere, it is not preferable that the insulating material is exposed in a vacuum atmosphere. Thus, it is preferable that substantially the whole surface of the polymer film 6" may be properly transformed (i.e., lowering the resistance) by the irradiation of the above-mentioned electron beams or laser beams.

Figure 4A:
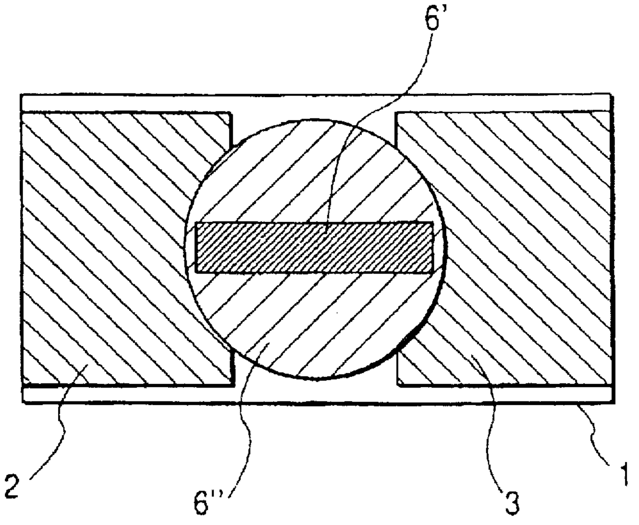
FIGS. 4A, 4B and 4C are sectional side views schematically illustrating another example of the method of manufacturing the electron-emitting device according to the present invention.
Figure 4B:
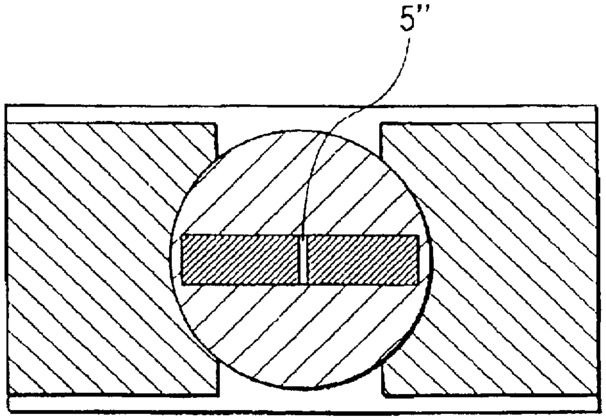
Figure 4C:
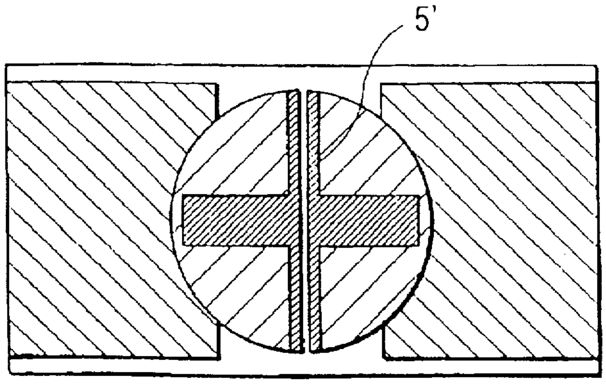

FIG. 4 shows different views (i.e., plan views) schematically viewing the electron-emitting device of the present invention, where the resistance of a part of the polymer film 6" is lowered in the direction parallel to the surface of the substrate. More concretely, FIG. 4A is before the step of voltage application, FIG. 4B is immediately after the start of the step of voltage application, and FIG. 4C is at the time of completing the step of voltage application.

At first, the application of a voltage allows a current to flow through the area 6' where the resistance is lowered, forming a narrow gap 5" in the conductive film 6". Such a gap 5" is the starting point of forming the gap 5' (FIG. 4B). As the current flows around the narrow gap 5", heat is applied on the periphery of the narrow gap 5". The area which has not been thermally decomposed becomes gradually thermally decomposed, so that the gap 5' is finally formed over the whole polymer film 6" in the direction substantially parallel to the surface of the substrate (FIG. 4C).

By the way, as described above, it is often the case that the polymer film on which the process of heat decomposition is partially conducted shows good electron-emitting characteristics. The reason for this is not clear. However, undecomposed polymers easily move in the vicinity of the gap 5' by means of thermal diffusion. Therefore, it is assumed that a gap more appropriate for the electron emission is formed and retained and is structured so as to be less deteriorated due to driving. In such a case, it is not preferable that an insulated part where the resistance thereof is not lowered because of the above-mentioned reason is exposed on the surface. Therefore, a resistive layer (conductive layer having higher sheet-resistance than that of the reitance-lowerd film 6') having an antistatic effect may be preferably formed on the whole surface containing the device except for the gap 5'.

Figure 5:
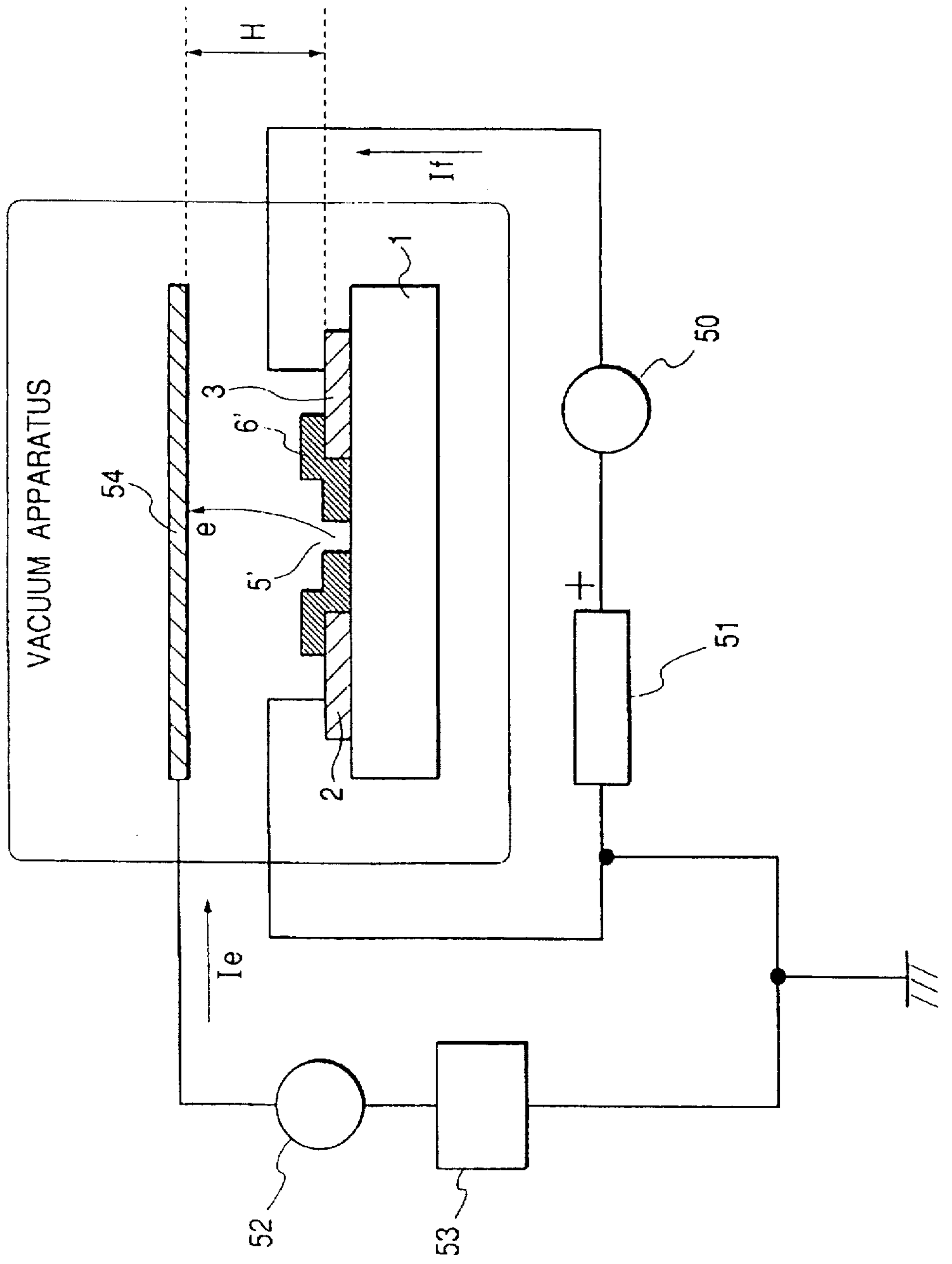
FIG. 5 is a schematic block diagram illustrating an example a vacuum apparatus equipped with a measurement-evaluating mechanism.
Figure 16:
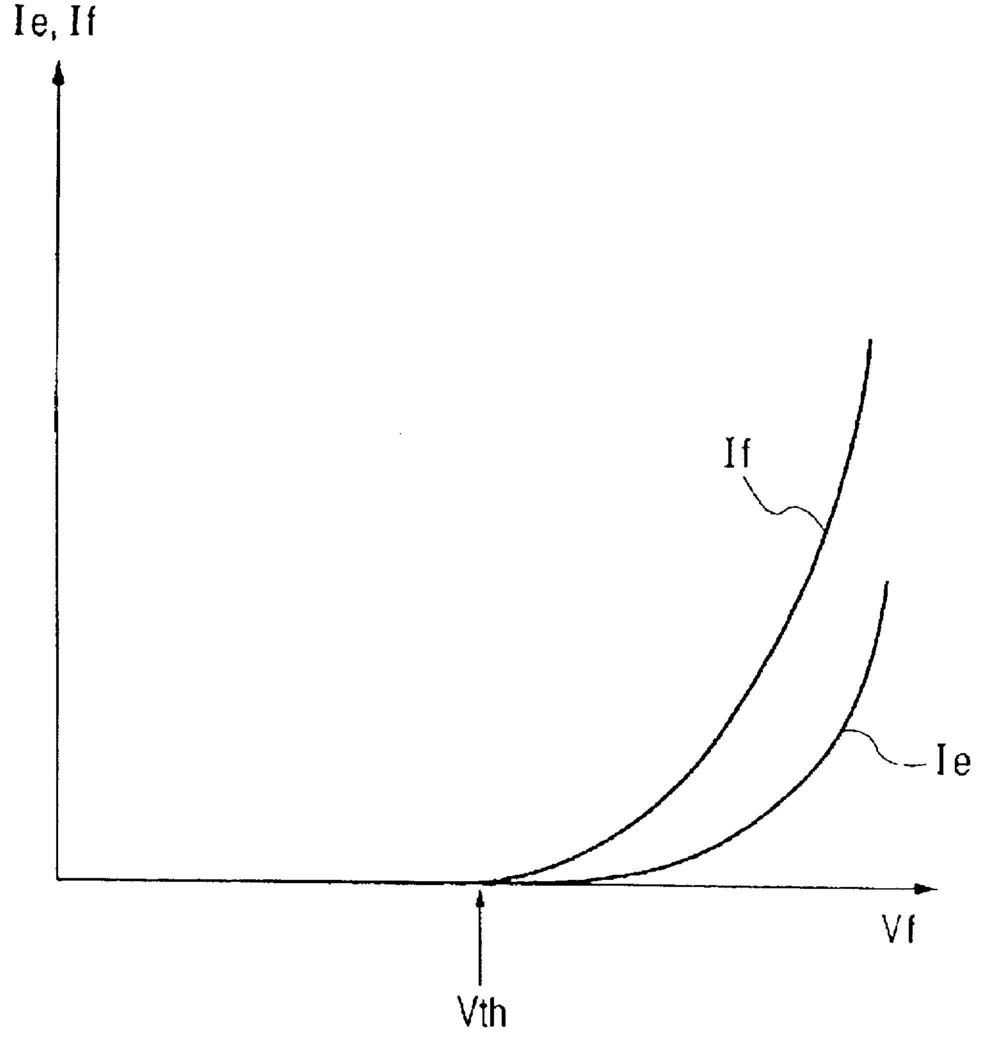
FIG. 16 is a graph representing the electron-emitting characteristics of the electron-emitting device according to the present invention.

The electron-emitting device obtained by the steps described above is subjected to the measurement of voltage-current characteristics using a measurement apparatus shown in FIG. 5. The resulting characteristics are shown in FIG. 16. In FIG. 5, the same reference numerals as those used in FIGS. 1A and 1B denote the same structural components as those of FIGS. 1A and 1B, respectively. Reference numeral 54 denotes an anode, 53 denotes a high-voltage power supply, 52 denotes an ampere meter for measuring an emission current Ie emitted from the electron-emitting device, 51 denotes a power supply for applying a drive voltage Vf on the electron-emitting device, and 50 denotes an ampere meter for measuring a device current flowing between the electrodes 2 and 3. The above electron-emitting device has a threshold voltage Vth. Therefore, if a voltage which is lower than the threshold voltage Vth is placed between the electrodes 2 and 3, there is no substantial emission of electrons. However, if a voltage which is higher than the threshold voltage Vth is placed, the generation of emission current (Ie) from the device and the generation of device current (If) flowing between the electrodes 2 and 3 are initiated.

As the electron-emitting device has the above characteristics, a plurality of the electron-emitting devices can be disposed in a matrix form on the same substrate to form an electron source. Therefore, it becomes possible to perform a matrix drive by selecting the desired device and driving the selected device.

Next, an example of the method of manufacturing an image forming apparatus using the electron-emitting device shown in FIG. 17 will be described below with reference to FIGS. 6 to 13.

(A) At first, a rear plate 1 is prepared. The rear plate 1 may be made of an insulating material, preferably made of glass.

Figure 6:
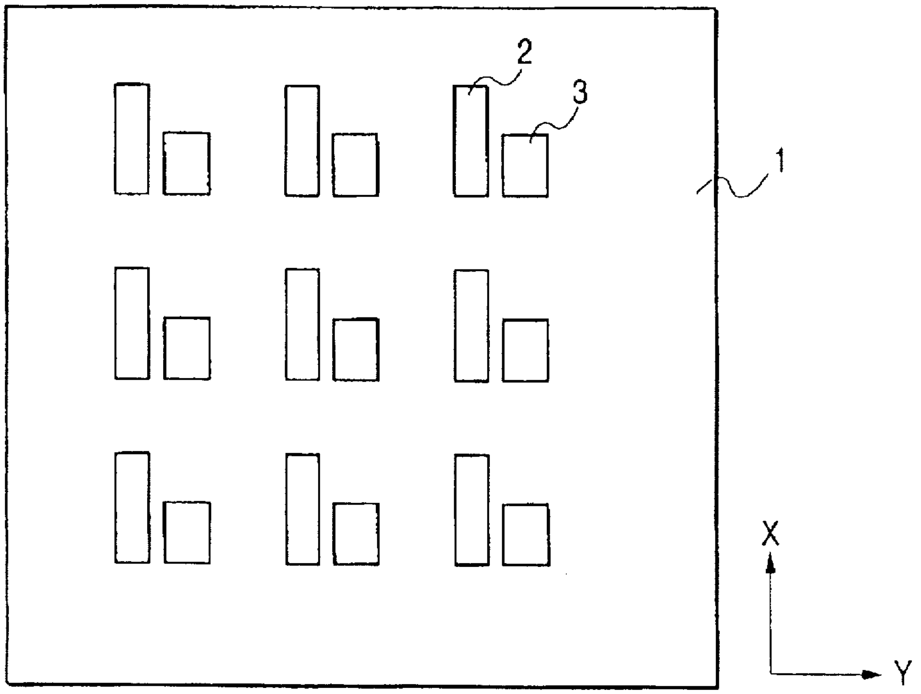
FIG. 6 is a plan view schematically illustrating an example of the process of manufacturing an electron source in a simplified matrix arrangement according to the present invention.

(B) Next, a plurality of pairs of electrodes 2 and 3 shown in FIGS. 1A and 1B are prepared and formed on the rear plate 1 (FIG. 6). The electrode material may be any material as far as it is a conductive material. In addition, the method of forming electrodes 2 and 3 may be one of various kinds of manufacturing methods well-known in the art, such as a sputtering method, a CVD method, and a printing method. In FIG. 6, for simplifying the explanation, there is shown an example in which nine pairs of electrodes in total, i.e., three pairs of electrodes in the X direction and three pairs of electrodes in the Y direction, are formed. According to the present invention, however, the number of the pairs of electrodes is appropriately defined depending on the resolution of the image forming apparatus.

Figure 7:
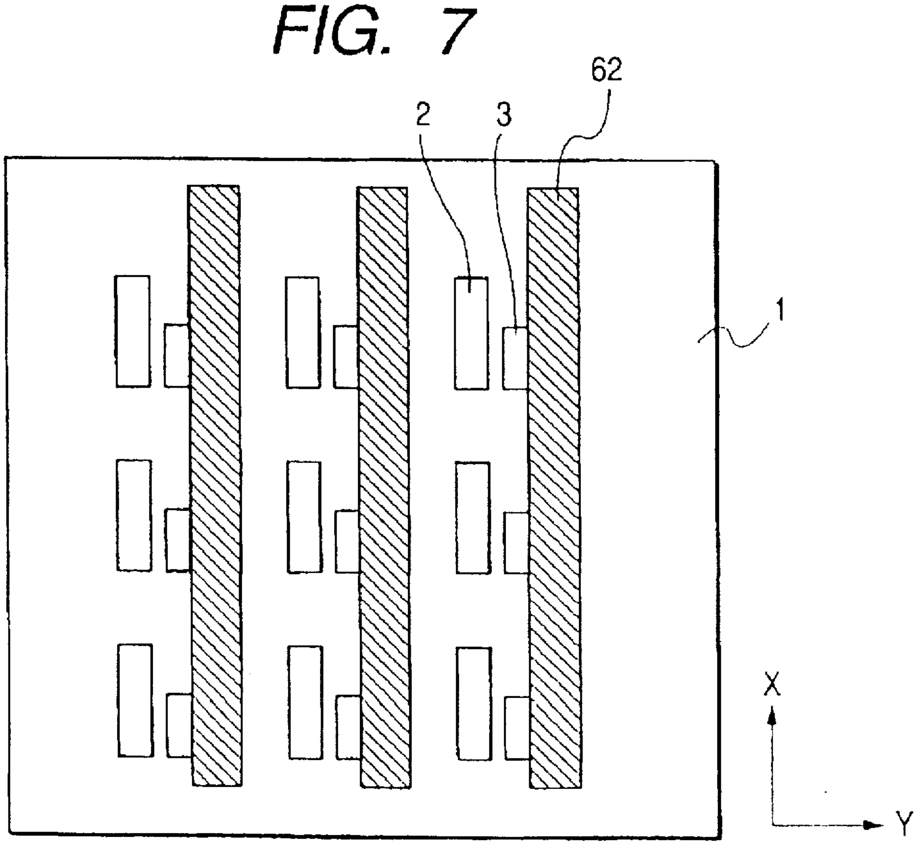
FIG. 7 is a plan view schematically illustrating an example of the process of manufacturing the electron source in the simplified matrix arrangement according to the present invention.

(C) Next, lower wirings 62 are formed on the substrate 3 such that a part of the electrode 3 is covered with the lower wiring 62 (FIG. 7). The method of forming the lower wiring 62 may be one selected from various kinds of methods well-known in the art. Preferably, it may be one of printing methods. Among the printing methods, a screen printing method is preferable because the lower wirings 62 can be formed on the substrate having a large area at low cost.

Figure 8:
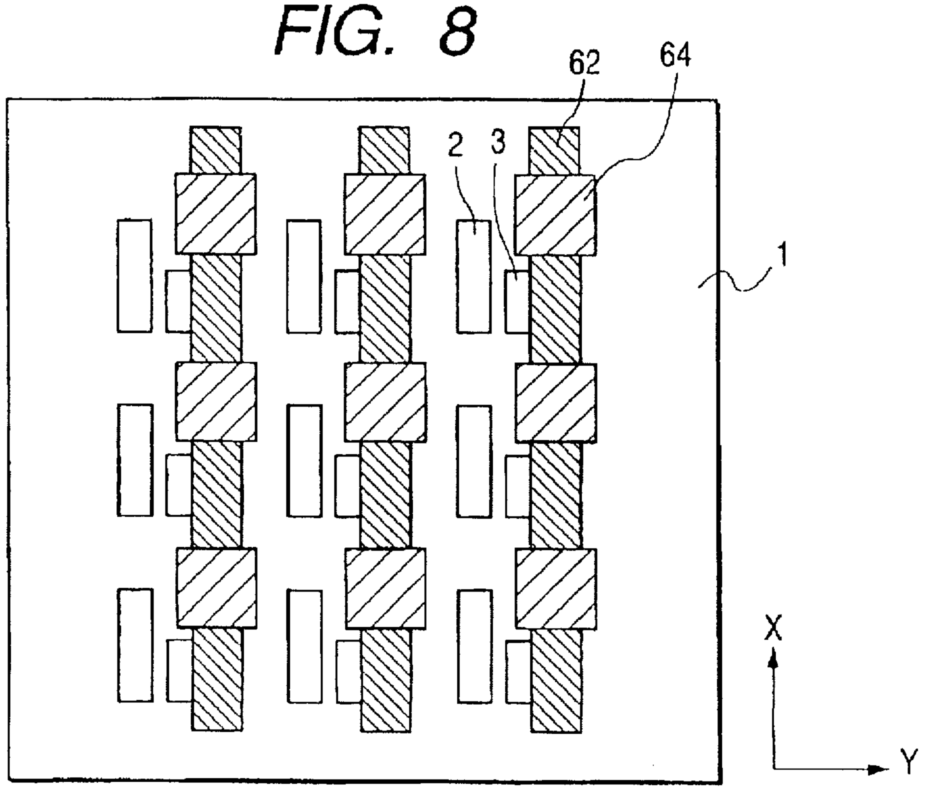
FIG. 8 is a plan view schematically illustrating an example of the process of manufacturing the electron source in the simplified matrix arrangement according to the present invention.

(D) An insulating layer 64 is formed on a position at the intersection of the lower wiring 62 and an upper wiring 63 formed in the subsequent step (FIG. 8). The method of forming the insulating layer 64 may be also one selected from various kinds of methods well-known in the art. Preferably, it may be one of printing methods. Among the printing methods, a screen printing method is preferable because the insulating layer 64 can be formed on the substrate having a large area at low cost.

Figure 9:
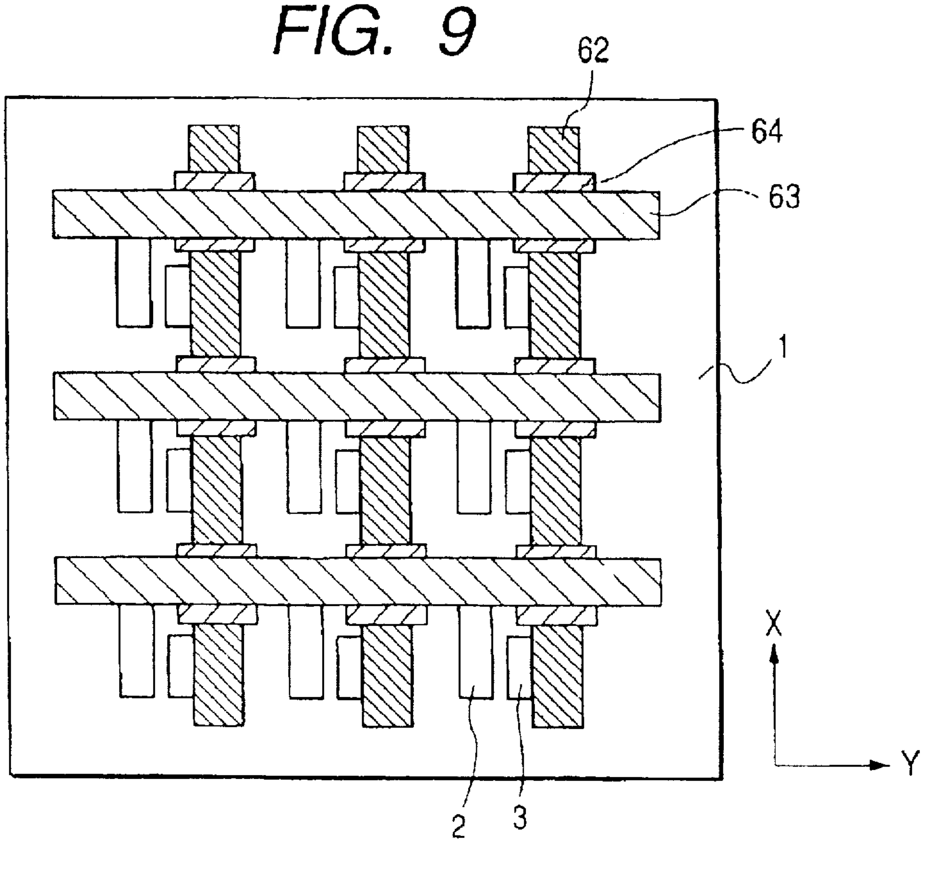
FIG. 9 is a plan view schematically illustrating an example of the process of manufacturing the electron source in the simplified matrix arrangement according to the present invention.
Figure 10:
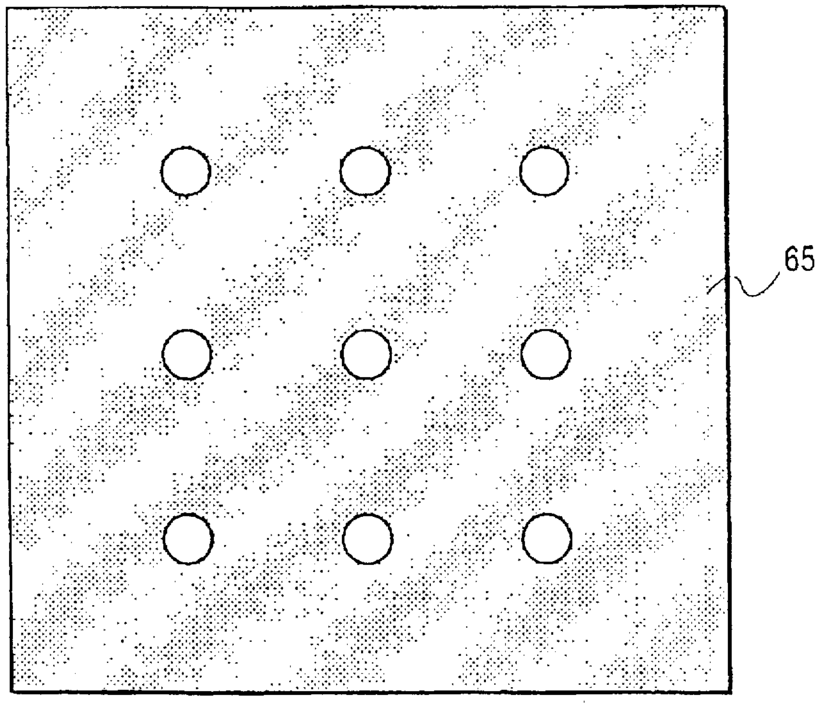
FIG. 10 is a plan view schematically illustrating a mask to be used in the process of manufacturing the electron source in the simplified matrix arrangement.

(E) Each of upper wirings 63 is formed on the substrate 1 such that a part of the electrode 2 is covered with the upper wiring 63. The upper wiring 63 extends in the direction substantially perpendicular to the lower wiring 62 (FIG. 9). The upper wiring 63 may be also formed by one of various kinds of methods well-known in the art. Just as in the case with the lower wiring 62, it may be preferably formed by one of printing methods. Among the printing methods, a screen printing method is preferable because the upper wirings 63 can be formed on the substrate having a large area at low cost.

Figure 11:
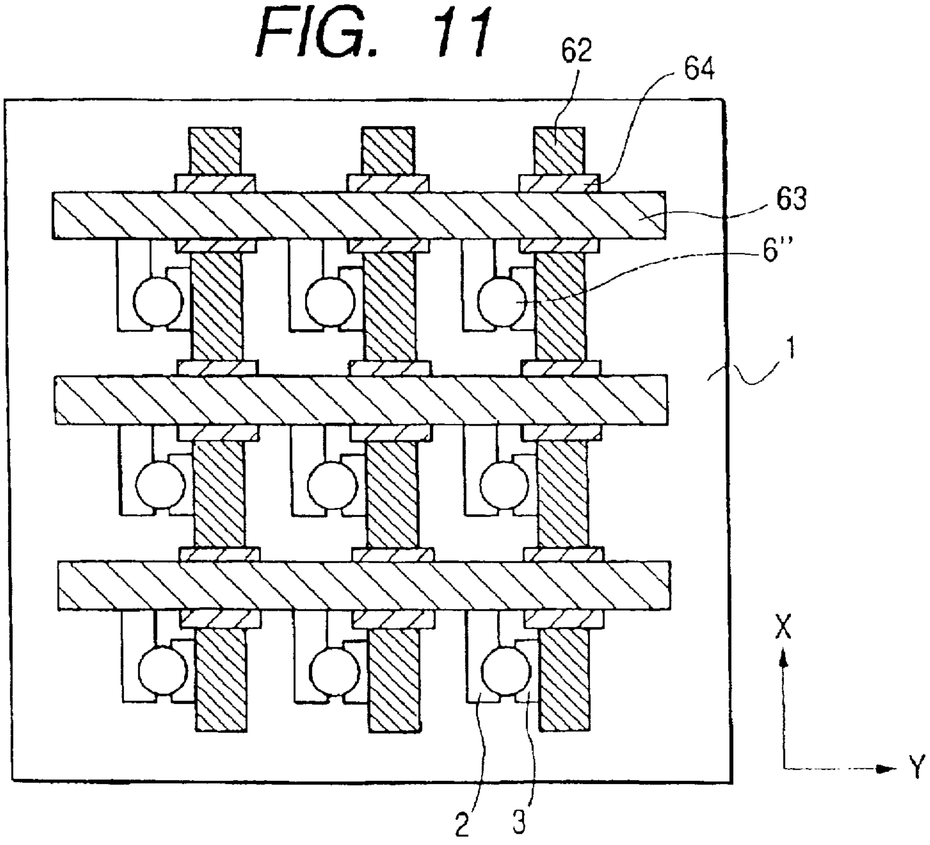
FIG. 11 is a plan view schematically illustrating an example of the process of manufacturing the electron source in the simplified matrix arrangement according to the present invention.

(F) Next, the polymer film 6" is formed such that it makes a connection between the electrodes 2 and 3 in each pair. The polymer film 6" can be prepared by the method described above. For easily forming such a polymer film 6" on a large surface area of the substrate 1, a spray method may be preferably used. Concretely, the polymer film 6" can be prepared by applying a polyimide precursor solution containing a photosensitive material on the whole surface of the substrate 1, pre-baking the substrate 1 in an oven, and irradiating light on the surface of the substrate 1 through a mask 65 (in the case of a negative-type photosensitive polymer) shown in FIG. 10, followed by developing, rinsing, and baking the substrate 1 to place the polymer film 6" comprised of a polyimide film on a predetermined position (FIG. 11).

Figure 12:
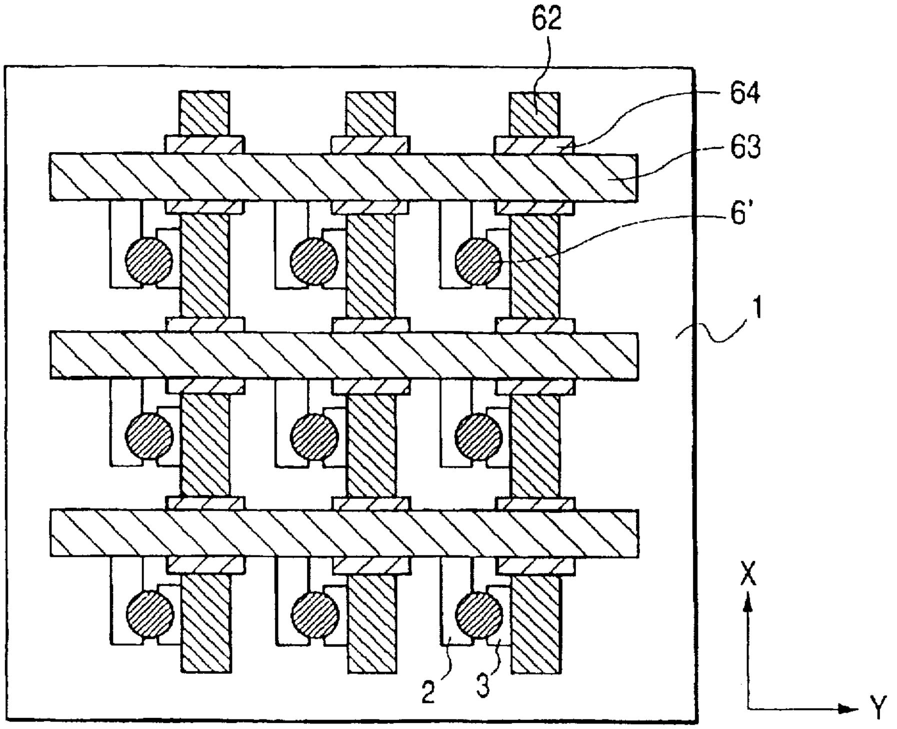
FIG. 12 is a plan view schematically illustrating an example of the process of manufacturing the electron source in the simplified matrix arrangement according to the present invention.

(G) Subsequently, as described above, each polymer film 6" is subjected to the "resistance-lowering process" to lower the resistance of the polymer film 6". The "resistance-lowering process" is performed by the irradiation of particle beams such as electron beams or ion beams or by the irradiation of laser beams. The "resistance-lowering process" is preferably performed in a reduced pressure atmosphere. This step allows the polymer film 6" to have an electric conductivity, so that the polymer film 6" can be transformed into a conductive film 6' (FIG. 12). Concretely, the resistance of the conductive film 6' is in the range of $10^3$ Ω/□ to $10^7$ Ω/□.

Figure 13:
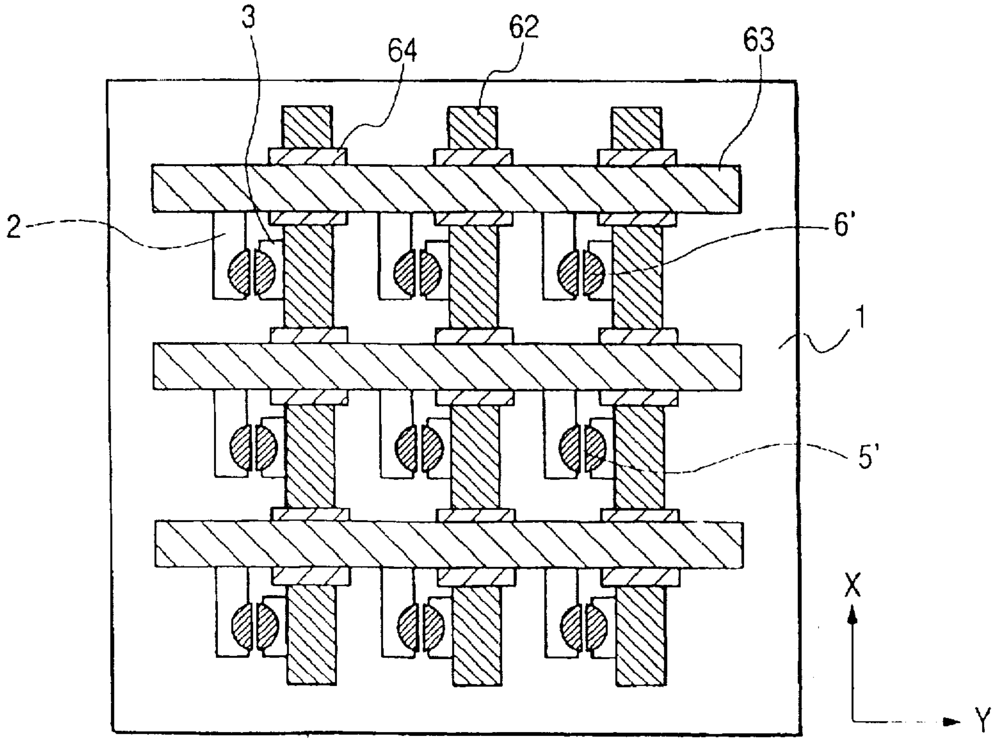
FIG. 13 is a plan view schematically illustrating an example of the process of manufacturing the electron source in the simplified matrix arrangement according to the present invention.
Figure 14A:
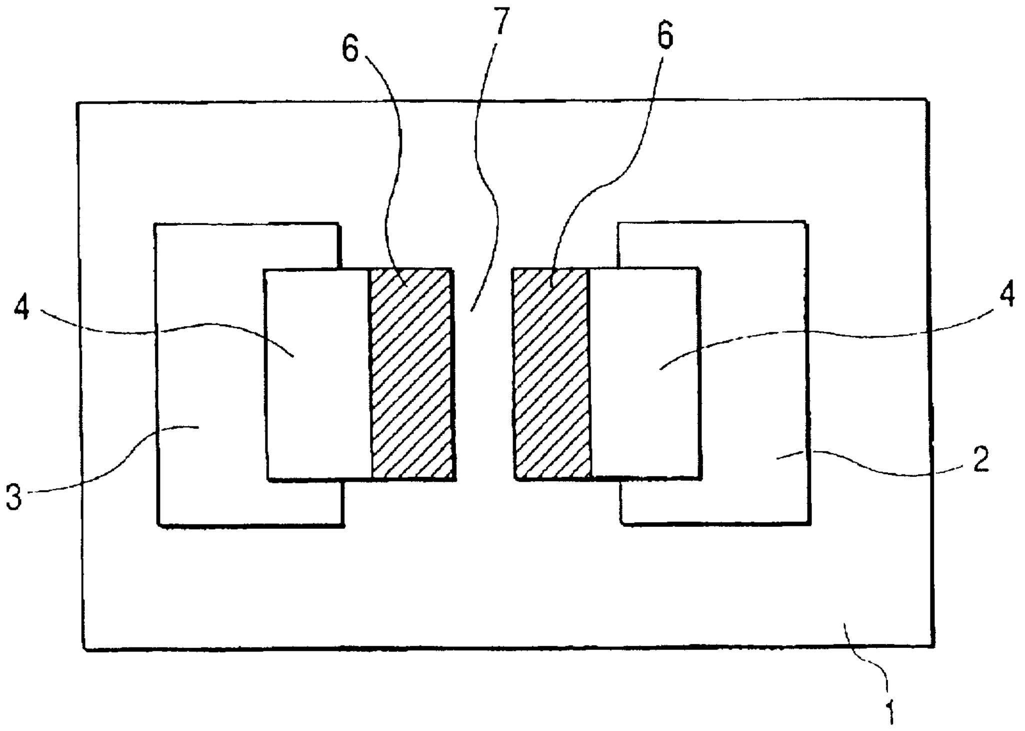
FIGS. 14A and 14B are a plan view (14A) and a sectional side view (14B) schematically illustrating the conventional electron-emitting device.
Figure 14B:
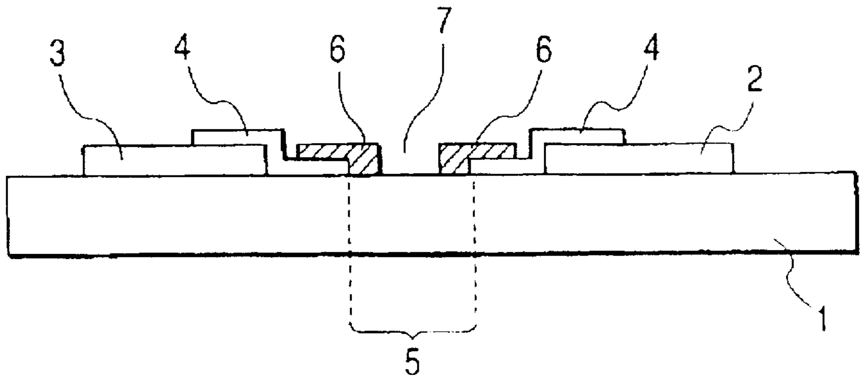
Figure 15A:
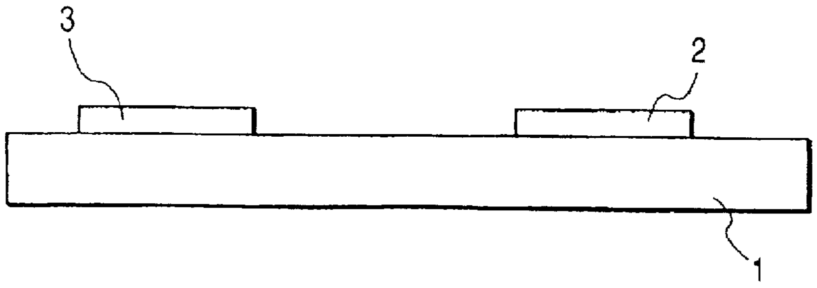
FIGS. 15A, 15B, 15C and 15D are sectional side views schematically illustrating the respective steps in the process of manufacturing the conventional electron-emitting device.
Figure 15B:
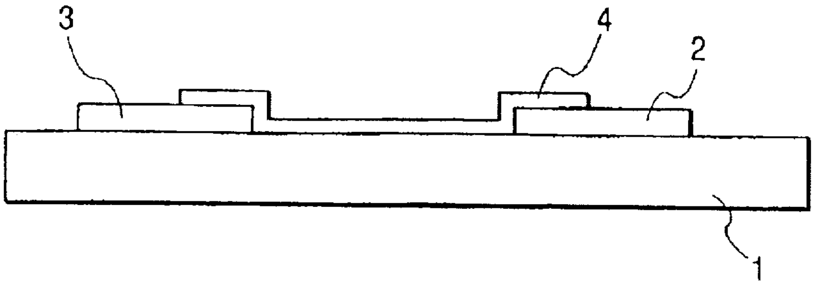
Figure 15C:
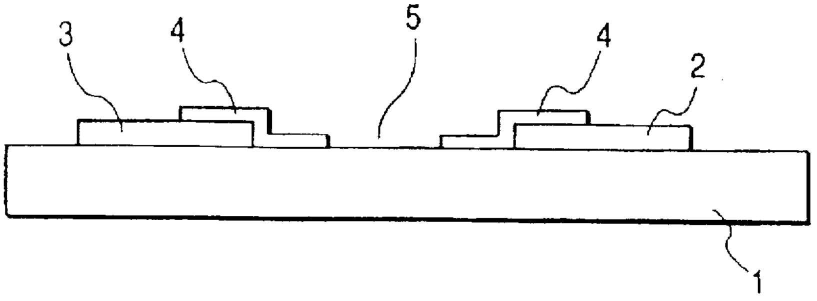
Figure 15D:
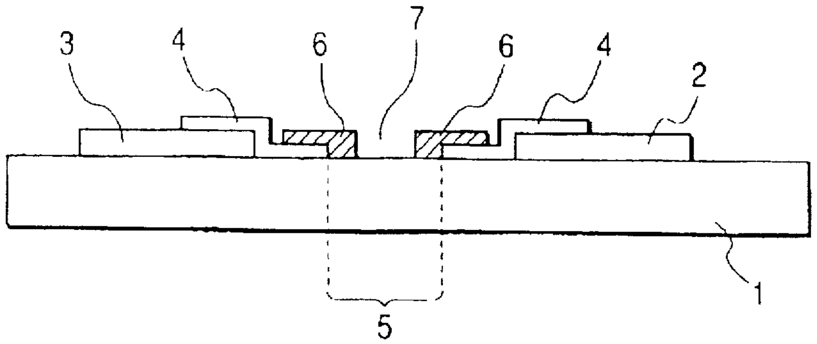

(H) Next, a gap 5' is formed in the conductive film 6' obtained in step (G). The formation of such a gap 5' can be attained by applying a voltage on each of the wirings 62 and 63. Thus, the voltage is applyed between the electrodes 2 and 3 of each pair. Furthermore, the voltage to be applied is preferably a pulse voltage. This step of voltage application forms the gap 5' in a part of the conductive film 6' (FIG. 13).

The step of voltage application may be performed concurrently with the above resistance-lowering process. That is, voltage pulses are successively applied between the electrodes 2 and 3 while irradiating electron beams or laser beams. Whatever the case may be, the application of voltage may be advantageously performed under a reduced pressure atmosphere.

Figure 18A:
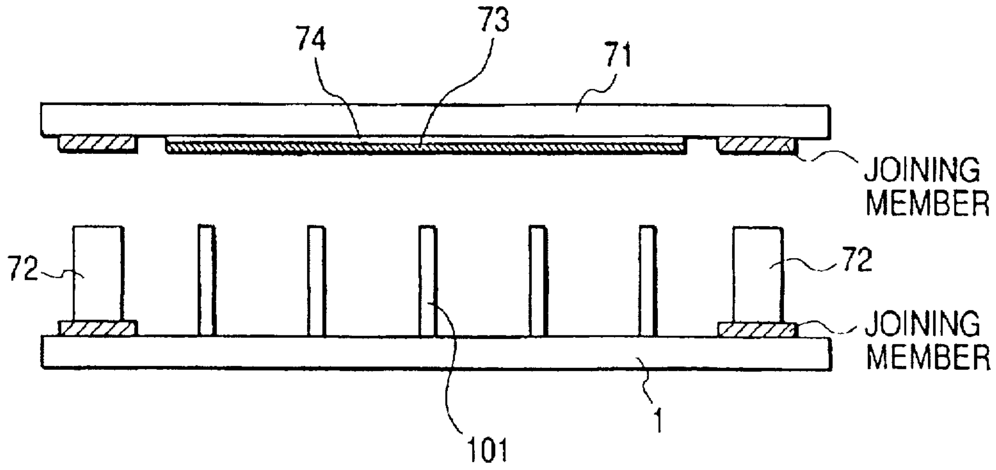
FIGS. 18A and 18B are sectional side views schematically illustrating an example of the process of manufacturing the image forming apparatus according to the present invention.

(I) Next, a face plate 71 having a phosphor film 74 and a metal back 73 made of an aluminum film, which is prepared in advance, and the rear plate 1 processed in the preceding steps (A) to (H) are aligned such that the metal back 73 faces the electron-emitting device (FIG. 18A). In addition, a joining member is arranged on a contact surface ((a) contact area) between the supporting frame 72 and the face plate 71. Likewise, another joining member is arranged on a contact surface ((a) contact area) between the rear plate 1 and the supporting frame 72. The above joining member to be used is one having the function of retaining vacuum and the function of adherence. Concretely, the joining member may be made of frit glass, indium, indium alloy, or the like.

Figure 18B:
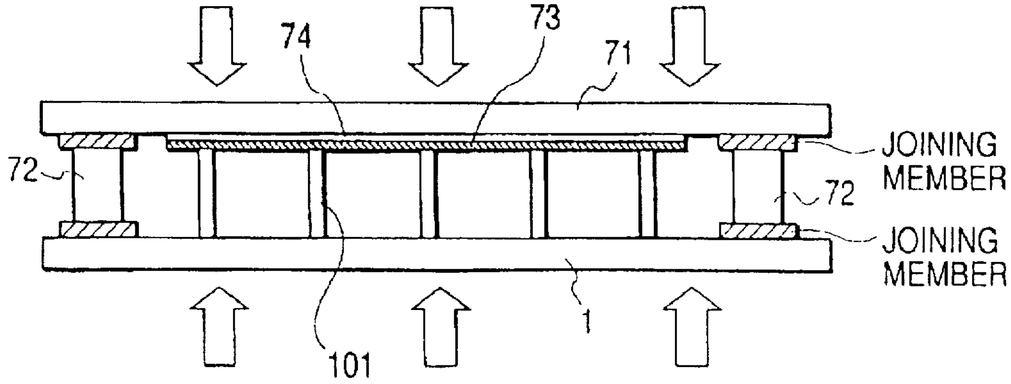

In FIGS. 18A and 18B, there is shown an example in which the supporting frame 72 is fixed (adhered) on the rear plate 1 preliminarily processed in the preceding steps (A) to (H). According to the present invention, however, it is not limited to make a connection between the supporting frame 72 and the rear plate 1 at the time of performing the present step (I). According to the present invention, the step of bonding (fixing) the supporting frame to the substrate 1 is performed after at least step (F) is performed. In FIGS. 18A and 18B, similarly, there is also shown an example in which the spacer 101 is fixed on the rear plate 1. According to the present invention, however, there is no need to always fix the spacer 101 on the rear plate 1 at the time of performing the present step (I).

Furthermore, in FIGS. 18A and 18B, there is shown an example in which the rear plate 1 is arranged on the lower side, while the face plate 71 is arranged on the upper side of the rear plate for the sake of convenience. According to the present invention, however, it is not limited to such an arrangement. There is no problem as to which one is on the upper side.

Furthermore, in FIGS. 18A and 18B, there is shown an example in which the supporting frame 72 and the spacer 101 are previously fixed (adhered) on the rear plate 1. According to the present invention, however, it is not limited to such a configuration. They may only be mounted on the rear plate 1 or the face plate 71, such that they will be fixed (adhered) in the subsequent "sealing step".

(J) Next, the sealing step is performed. The face plate 71 and the rear plate 1, which have been arranged to face each other in the above step (I), are pressurized in the direction in which they are facing each other, while at least the joining member is heated. It is preferable to heat the whole surface of each of the face plate and the rear plate for decreasing the thermal distortion.

In the present invention, furthermore, the above "sealing step" may be preferably performed in a reduced pressure (vacuum) atmosphere or in a non-oxidative atmosphere. Concretely, the reduced pressure (vacuum) atmosphere may be at a pressure of $10^{-5}$ Pa or less, preferably at a pressure of $10^{-6}$ Pa or less.

This sealing step allows the contact portion between the face plate 71 and the supporting frame 72 and the contact portion between the supporting plate 72 and the rear plate to be airtight. Simultaneously, an airtight container (an image forming apparatus) 100 shown in FIG. 17 and having the inside kept at a high vacuum can be obtained.

Here, the above example is the "sealing step" performed in a reduced pressure (vacuum) atmosphere or in a non-oxidative atmosphere. According to the present invention, however, the above "sealing step" may be performed in the air. In this case, an exhaust tube for exhausting air from a space between the face plate 71 and the rear plate may be additionally formed in the airtight container 100. After the "sealing step", the exhaust tube exhausts air from the inside of the airtight container 100 so as to become a pressure of $10^{-5}$ Pa or less. Subsequently, the exhaust tube is closed to obtain the airtight container (the image forming apparatus) 100 with the inside thereof being kept in a high vacuum.

If the above "sealing step" is performed in a vacuum, for keeping the inside of the image forming apparatus (the airtight container) 100 in a high vacuum, it is preferable to include a step of covering the metal back 73 (the surface of the metal back facing to the rear plate 1) with a getter material between the above step (I) and step (J). At this time, the getter material to be used is preferably an evaporative getter (ex. Ba getter) because it simplifies the covering. Therefore, it is preferable to use barium as a getter film and to cover the metal back 73 with the getter film. Furthermore, the step of covering with the getter is performed under a reduced pressure (vacuum) atmosphere just as in the case of the above step (J).

Also, in the example of the image forming apparatus described above, the spacer 101 is arranged between the face plate 71 and the rear plate 1. However, if the size of the image forming apparatus is small, the spacer 101 is not necessarily required. In addition, if the distance between the rear plate 1 and the face plate 71 is about several hundred micrometers, there is no need to obtain the support frame 72. It is possible to join tightly the rear plate 101 and face plate 71 with the joining member. In such a case, the joining member also supports as an alternative material of the supporting frame 72.

In the present invention, furthermore, after the step (step (H)) of forming a gap 5' of the electron-emitting device 102, the positioning step (step (I)) and the sealing step (step (J)) are performed. However, step (H) may also be performed after the sealing step (step J).

EXAMPLES

Hereinafter, the present invention will be described below by means of examples thereof. However, the present invention is not construed to as being limited to the examples described below.

Preparation Example 1 of a Photosensitive Polyimide Solution (1) A four-necked flask equipped with a stirrer, a nitrogen introduction tube, a calcium chloride tube, an exhaust tube, and a thermometer, were substituted with a nitrogen gas in advance. Then, 100 g (0.04 mole) of polyamic acid (solid content 13.5%, and solvent N-methyl-2-pyrrolidone) was charged in this flask under a nitrogen air flow, followed by adding 15 g (0.01 mole) of newly distilled dimethylaminoethyl acrylate in the flask. Then, the resulting mixture was kept at room temperature and was then stirred for one hour, resulting in the solution containing polyamic acid and dimethylaminoethyl acrylate. Subsequently, 60.2 g of super graded N,N-dimethylacetamide was added in 46 g of the solution in which polyamic acid and dimethylaminoethyl acrylate forms a salt, followed by ultrasonically mixing together and obtaining a mixed solution.

(2) Additionally, under nitrogen air flow, a solution was prepared by dissolving 4 g of a photopolymerizing initiator, 1-hydroxycyclohexyl phenylketone and 2 g of a sensitizer, 4'-dimethylaminoacetophenone with 12 g of super graded N,N-dimetylacetamide.

1.8 g of the above (2) solution was added to 106.2 g of the above (1) solution and they were mixed together under ultrasonication, followed by passing through a filter with a pore size of 5 μm under pressure. Furthermore, the above (1) solution and the above (2) solution were prepared under a yellow lamp and were then stored in a freezer.

Preparation Example 2 of the Photosensitive Polyimide Solution

A four-opening flasks equipped with a stirrer, a nitrogen introduction tube, an exhaust tube equipped with a calcium chloride tube, and a thermometer, were substituted with a nitrogen gas in advance. Then, 800 g of toluene, 36.7 g of o-nitrobenzyl alcohol (0.24 mol), and 35.3 g of biphthalic acid anhydride (0.12 mol) were charged and refluxed for 5 hours, followed by letting the solution stand overnight. A precipitated crystal was washed in toluene and was then dried under a reduced pressure, resulting in 43 g of di(o-nitrobenzylester) biphthalate. The yield was 60%.

Next, 24 g of di(o-nitrobenzylester) biphthalate (0.04 mol) was refluxed for two hours in 150 g toluene and 150 g of thionyl chloride in the presence of a small amount of N,N-dimethylformamide, followed by standing to be cooled down to a room temperature, resulting in 17.3 g of di(o-nitrobenzylester) biphthalate dichloride. The yield was 68%.

Next, 1 g of 4,4'-diaminodiphenylether, 0.63 g of sodium carbonate anhydride, 200 ml of acetone, and 100 ml of distilled water were added in a beaker and were then mixed. Subsequently, 3.18 g of di(o-nitrobenzylester) biphthalate dichloride and 150 g of chloroform solution were further added in the mixture, followed by stirring strongly. The mixture was stirred for 15 minutes while cooling. Then, 1000 ml of distilled water was added and acetone and chloroform were removed by means of a tap aspirator. The thus obtained white precipitate was washed in distilled water and was then dried, resulting in 3.8 g of a photosensitive polyimide precursor. Subsequently, it was diluted with N-methylpyrolidone or the like to prepare a solution with a desired concentration of the photosensitive polyimide precursor.

Example 1

As an electron-emitting device of this example, an electron-emitting device of the same type as one shown in FIGS. 1A and 1B was prepared by the same method as one shown in FIGS. 2A to 2D and 3A to 3C. Referring now to FIGS. 1A to 3C, the method of manufacturing an electron-emitting device of this example will be described below.

As a substrate 1, a silica glass was used. The silica glass was washed in pure water and an organic solvent, sufficiently. After that, device electrodes 2 and 3 made of platinum were formed on the substrate 1 (FIG. 2A). At this time, the distance L between the device electrodes 2 and 3 were 10 μm. In addition, the width W of the device electrode was 500 μm, while the thickness thereof was 100 nm.

A solution of photosensitive polyimide precursor prepared in "Preparation Example 1 of photosensitive polyimide" was subjected to a spin-coating using a spin coater, followed by being heated for three minutes at 80° C. on a hot plate. Then, the solvent was dried (FIG. 2B).

Next, a mask 22 having a circular opening of 300 μm in diameter extending over the device electrodes 2 and 3, followed by developing with a super-high pressure mercury lamp (FIG. 2C). The light exposure was 100 mJ/cm$^2$. After that, an immersing development was performed using a mixed solvent of N-methyl-2-pyrolidone and lower alcohol. Furthermore, the substrate 1 was rinsed in isopropyl alcohol, followed by heating at 200° C. for 30 minutes in the oven. Subsequently, it was baked at a temperature of up to 350° C. to make it into an imide form. The resulting pattern image was excellent and the film thickness of the polymer film 6" was 30 nm (FIG. 3A).

Furthermore, the substrate 1 on which device electrodes 2 and 3 and the polymer film 6" were formed in a vacuum container where an electron gun was equipped. After sufficient exhaust, electron beams were irradiated on the whole surface of polymer film 6" under the conditions where acceleration voltage Vac=10 kV and the current density ρ=0.1 mA/mm$^2$ (FIG. 3B). At this time, the resistance between the device electrodes 2 and 3 were measured and the electron beam irradiation was stopped when the resistance was reduced to 1 kΩ.

Next, in the vacuum apparatus shown in FIG. 5, the substrate 1 formed with the electrodes 2 and 3 and the polymer film 6 on which the laser beams were irradiated (the carbon based conductive film 6') was transferred.

Here, in FIG. 5, reference numeral 51 denotes an electric supply for applying a voltage to the device, 50 denotes an ampere mater for measuring a device current If, 54 denotes an anode electrode for the measurement of emission current Ie to be generated from the device, 53 denotes a high-voltage power supply for applying a voltage to the anode electrode 54, and 52 denotes an ampere mater for measuring the emission current.

At the time of measurements of the device current If and the emission current Ie, the power supply 51 and the ampere mater 50 are connected to their respective device electrodes 2 and 3. In addition, an anode electrode 54 is arranged above the electron-emitting device, where the anode electrode 54 is connected to the electric supply 53 and the ampere mater 52.

In addition, the electron-emitting device and the anode electrode 54 are arranged in the vacuum device, which is equipped with necessary devices, although not shown, such as an exhausting pipe, a vacuum gauge, and the like, so that the measurement can be performed in a predetermined vacuum condition. By the way, the distance H between the anode electrode and the electron-emitting element was 4 mm and the pressure in the vacuum device was $1\times10^{-6}$ Pa.

Using the device system shown in FIG. 5, rectangular pulses of 25 volts, a pulse width of 1 msec, and a pulse spacing of 10 msec were placed between the device electrodes 2 and 3 such that a narrow gap 5' was formed in the conductive film 6'.

According to the steps described above, the electron-emitting device of the present invention was prepared.

Next, in the vacuum device shown in FIG. 5, a voltage of 1 kV is applied on the anode electrode 54, while placing a drive voltage of 22V between the device electrodes 2 and 3 of the electron-emitting device of this example. Subsequently, a device current If and an emission current Ie flowing at that time were measured, resulting in a stable electron-emitting characteristics where If=0.6 mA and Ie=4.3 μA. Therefore, the electron-emitting characteristics could be kept in stable even though the device was driven for a long time.

Finally, the narrow gap 5' and its surroundings were observed using a transmission electron microscope (TEM) by cutting the cross sectional side of the electron-emitting device of the present embodiment. As a result, the same structure as that of FIG. 1B was observed.

Example 2

As an electron-emitting device of this example, the electron-emitting device of the same type as one shown in FIGS. 1A and 1B was prepared by the same method as one shown in FIGS. 2A to 2D and 3A to 3C. In this example, furthermore, the formation of a polymer film used a solution of photosensitive polyimide precursor prepared in "Preparation Example 2 of photosensitive polyimide". Accordingly, referring now to FIGS. 1A, 1B, 2A to 2D, and 3A to 3C, the method of manufacturing an electron-emitting device of this example will be described.

As a substrate 1, a silica glass was used. The silica glass was washed in purified water and an organic solvent, sufficiently. After that, device electrodes 2 and 3 made of platinum were formed on the substrate 1 (FIG. 2A). At this time, the distance L between the device electrodes 2 and 3 was 10 μm. In addition, the width W of the device electrode was 500 μm, while the thickness thereof was 100 nm.

A 3% solution of photosensitive polyimide precursor prepared in "Preparation Example 2 of photosensitive polyimide" and diluted with N-methyl-2-pyrolidone was subjected to a spin-coating using a spin coater, followed by being heated for three minutes at 80° C. on a hot plate. Then, the solvent was dried (FIG. 2B).

Next, a mask 22 with an opening except of a circular portion of 300 μm in diameter extending over the device electrodes 2 and 3, followed by exposing with a mercury-xenon lamp (500 W) (FIG. 2D) and developing in a tetramethyl ammonium hydroxide aqueous solution. Furthermore, the substrate 1 was rinsed in distilled water, followed by heating at 120° C. for 30 minutes in the oven. Subsequently, it was baked at a temperature of up to 350° C. to make it into an imide form. The resulting pattern image was excellent and the film thickness of the polymer film 6" was 30 nm (FIG. 3A).

Next, under the same conditions as those in Embodiment 1, electron beams were irradiated on the entire polymer film 6", and then transferred in the vacuum device shown in FIG. 5.

Using the device system shown in FIG. 5, as in Example 1, rectangular pulses of 22 volts, a pulse width of 1 msec, and a pulse spacing of 10 msec were placed between the device electrodes 2 and 3 such that a narrow gap 5' was formed in the conductive film 6' (the polymer film where the resistance thereof was lowered). According to the steps described above, the electron-emitting device of the present invention was prepared.

Next, in the vacuum device shown in FIG. 5, an anode voltage of 1 kV is applied, while placing a drive voltage of 20 V between the device electrodes 2 and 3 of the electron-emitting device of this example. Subsequently, a device current If and an emission current Ie flowing at that time were measured, resulting in a stable electron-emitting characteristics where If=0.8 mA and Ie=3.6 μA. Therefore, the electron-emitting characteristics could be kept in stable even though the device was driven for a long time.

Finally, the narrow gap 5' and its surroundings were observed using a transmission electron microscope (TEM)

by cutting the cross sectional side of the electron-emitting device of the present embodiment. As a result, the same structure as that of FIG. 1B was observed.

Example 3

An electron-emitting device of this example is principally of the same configuration as that of the electron-emitting device described in each of Examples 1 and 2. Referring again to FIGS. 1A, 1B, 2A to 2D, and 3A to 3C, a method of manufacturing an electron-emitting device of this example will be described.

As a substrate 1, a quartz glass substrate was used. The silica glass substrate was washed in distilled water and an organic solvent, sufficiently. After that, device electrodes 2 and 3 made of ITO were formed on the substrate 1 (FIG. 2A). At this time, the distance L between the device electrodes 2 and 3 was 10 μm. In addition, the width W of the device electrode was 500 μm, while the thickness thereof was 100 nm.

Just as in Example 1, a polymer film 6" comprised of a polyimide film was prepared from a photosensitive polyimide precursor and was provided on the substrate 1 thus prepared.

The substrate 1, having the device electrodes 2 and 3 made of ITO and the polymer film 6" comprised of the polyimide film prepared from the photosensitive polyimide precursor by the same way as that of Example 1, was placed on a stage. Then, the second harmonic (SHG: a wavelength of 532 nm) of Q switch pulse Nd:YAG laser (a pulse width of 100 nm, a repetition frequency of 10 kHz, a beam diameter of 10 μm) was irradiated on the polymer film 6". At this time, the stage was moved to irradiate the polymer film 6" in the direction from the device electrode 2 to the device electrode 3 with a width of 10 μm. At this time, furthermore, the resistance between the device electrodes 2 and 3 was measured. The laser irradiation was terminated when the resistance decreases to 10 kΩ.

Here, the substrate 1 was picked up and was then observed with an optical microscope. As a result, the same configuration as one shown in FIG. 4A was observed.

Using the device system shown in FIG. 5, just as in Example 1, rectangular pulses of 25 V, a pulse width of 1 msec, and a pulse interval of 10 msec were applied between the device electrodes 2 and 3 such that a narrow gap 5' was formed in the polymer film, resulting in the electron-emitting device of the present embodiment.

Next, in the vacuum device shown in FIG. 5, while an anode voltage of 1 kV is applied, a drive voltage of 22 V is applied between the device electrodes 2 and 3 of the electron-emitting device of this example. Subsequently, a device current If and an emission current Ie flowing at that time were measured, resulting in a stable electron-emitting characteristics where If=0.8 mA and Ie=4.3 μA. Therefore, the electron-emitting characteristics could be kept stable even though the device was driven for a long time.

Finally, the electron-emitting device of this example was observed using an optical microscope. As a result, the same structure as that of FIG. 4C was observed.

Example 4

In this example, an image forming apparatus 100 schematically illustrated in FIG. 16 was prepared. As an electron-emitting device 102, it was prepared by the method already described above using FIGS. 1A, 1B, 2A to 2D, and 3A to 3C. Referring now to FIGS. 6 to 13, 17, 18A and 18B, a method of manufacturing an image-forming apparatus will be described below.

FIG. 13 is an enlarged view schematically illustrating a part of an electron source which comprises a rear plate, a plurality of electron-emitting devices formed on the rear plate, and wirings for applying signals on the plurality of electron-emitting devices. In the figure, reference numeral 1 denotes a rear plate, 2, 3 denote electrodes, 5' denotes a gap, 6' denotes a carbon-based conductive film (a carbon film), 62 denotes a X directional wiring, 63 denotes a Y directional wiring, and 64 denotes an interlayer insulting layer.

In FIG. 17, the same reference numerals as those of FIG. 13 represent the same structural components, respectively. Reference numeral 71 denotes a face plate comprised of a glass substrate on which a phosphor film 74 and a metal back 73 made of Al are laminated, and 72 denotes a supporting frame. A vacuum container is composed by the rear plate 1, the face plate 71, and the supporting frame 72.

Here, this example will be described with reference to FIGS. 6 to 13, 17, 18A and 18B.

(Step 1)

A platinum (Pt) film of 100 nm in thickness was deposited on the glass substrate 1 by a spattering method and the electrodes 2 and 3 made of the Pt film were formed using a photolithographic technique (FIG. 6). Here, the distance between the electrodes 2 and 3 was 10 μm.

(Step 2)

Next, a silver (Ag) paste was printed on the substrate 1 by a screen printing method and was then baked by the application of heat to form the wiring 62 in the X direction (FIG. 7).

(Step 3)

Subsequently, an insulating paste was printed on a position at an intersecting point between the wiring 62 in the X direction and the wiring 63 in the Y direction by a screen printing method, and then baked by the application of heat to form the insulating layer 64 (FIG. 8).

(Step 4)

Furthermore, the Ag paste was printed on the substrate 1 by a screen printing method and was then baked by the application of heat to form the wiring 63 in the Y direction, resulting a matrix wiring on the substrate 1 (FIG. 9).

(Step 5)

A photosensitive polyimide precursor solution prepared in "Preparation Example 1 of photosensitive polyimide" was applied on the substrate 1 by means of a spray method so as to be extended over the electrodes 2 and 3 on the substrate 1 where the matrix wiring was formed as described above. Then, the solvent was dried in an oven. After that, the substrate 1 was subjected to a mirror projection exposure machine using an extra-high pressure mercury lamp as an light source through a mask 65 (FIG. 10) having a circular opening with 100 μm in diameter, which extends over the device electrodes in each device. After that, the substrate 1 was subjected to an immersed development using a mixture solution of N-methyl-2-pyrrolidone and lower alcohol. Furthermore, the substrate 1 was rinsed in isopropyl alcohol and was then heated in the oven at 200° C. for 30 minutes, followed by baking at 350° C. in a vacuum, resulting in a polymer film 6" comprised of a polyimide film in the shape of a circle having a diameter of about 100 μm and a film thickness of 30 nm (FIG. 11).

(Step 6)

The rear plate 1, having the electrodes 2 and 3 made of Pt, the matrix wirings 62 and 63 and the polymer film 6" comprised of the polyimide film was placed on a stage (in the air). Then, the second harmonic (SHG) of Q switch pulse Nd:YAG laser (a pulse width of 100 nm, a repetition frequency of 10 kHz, a beam diameter of 10 μm) was irradiated on the polymer film 6". At this time, the stage was moved to irradiate the polymer film 6" in the direction from the electrode 2 to the electrode 3 with a width of 10 μm. A conductive area where thermal decomposition is progressed was prepared on a part of each polymer film 6".

(Step 7)

Onto the rear plate 1 prepared as described above, the supporting flame 72 and a spacer 101 were adhered using a frit glass. Then, the rear plate 1 onto which the spacer 101 and the supporting frame 72 are adhered was faced to the face plate 71 (facing the surface on which the phosphor film 74 and the metal back 73 were formed with the surface on which the wirings 62, 63 were formed) (FIG. 18A). Furthermore, the frit glass was applied on the contacting portion with the supporting frame 72 on the face plate 71 in advance.

(Step 8)

The face plate 71 and the rear plate 1 which were opposite to each other were sealed with each other by heating and pressing at 400° C. in a vacuum atmosphere of $10^{-6}$ Pa. As a result of this step, a sealed container retaining a high vacuum in the inside was obtained. In the phosphor film 74, phosphors of the three primary colors (RGB) were arranged in a strip shape.

Finally, rectangular pulses of 25 V, a pulse width of 1 msec, and a pulse interval of 10 msec were applied between the electrodes 2 and 3 in each pair through the X directional wiring and the Y directional wiring to form the gap 5' in the carbon-based conductive film 6' (FIG. 13), resulting in the image forming apparatus 100 of this example.

In the image forming apparatus completely constructed as described above, through the X directional wiring and the Y directional wiring, a desired electron-emitting device was selected to be applied with a voltage of 22 V, and a voltage of 8 kV was applied on the metal back 73 through a high-voltage terminal Hv. As a result, an excellent image could be clearly obtained for a long time.

According to the present invention, the polymer film including a photosensitive material is subjected to patterning using light so that it can be prepared as one having a large area and a uniform shape. In addition, the resistance of the polymer film can be lowered to form a gap, so that the improvement in electron-emitting characteristics can be attained as the uniformity of each device can be increased. The electron source in which the plurality of electron-emitting devices or the image forming apparatus can be display a clear image with an excellent quality in a large area for a long time.

What is claimed is:

1. A method of manufacturing an electron-emitting device, comprising the steps of:

forming a pair of electrodes on a substrate;

forming a polymer film containing a photosensitive material such that the polymer film makes a connection between the electrodes;

patterning the polymer film containing the photosensitive material into a desired configuration by using a light;

lowering the resistance of the patterned polymer film to obtain a resistance-lowered film; and forming a gap in the resistance-lowered film.

2. A method of manufacturing an electron-emitting device according to claim 1, wherein the polymer film containing the photosensitive material is a negative-type photosensitive polymer film.

3. A method of manufacturing an electron-emitting device according to claim 2, wherein the step of patterning using the light is performed by exposing a desired area of the negative-type photosensitive polymer film to the light and then removing an unexposed area of the negative-type photosensitive polymer film.

4. A method of manufacturing an electron-emitting device according to claim 1, wherein the polymer film containing the photosensitive material is a positive-type photosensitive polymer film.

5. A method of manufacturing an electron-emitting device according to claim 4, wherein the step of patterning using the light is performed by exposing an area other than a desired area of the positive-type photosensitive polymer film to the light and then removing an exposed area of the positive-type photosensitive polymer film.

6. A method of manufacturing an electron-emitting device according to claim 1, wherein the patterned polymer film is a polyimide film.

7. A method of manufacturing an electron-emitting device according to claim 1, wherein the step of lowering the resistance of the polymer film includes the step of irradiating light on the patterned polymer film.

8. A method of manufacturing an electron-emitting device according to claim 1, wherein the step of lowering the resistance of the polymer film includes the step of irradiating electron beam on the patterned polymer film.

9. A method of manufacturing an electron-emitting device according to claim 1, wherein the step of lowering the resistance of the polymer film includes the step of irradiating ion beam on the patterned polymer film.

10. A method of manufacturing an electron-emitting device according to claim 1, wherein the step of lowering the resistance of the polymer film includes the step of heating the patterned polymer film.

11. A method of manufacturing an electron-emitting device according to claim 1, wherein the step of forming a gap in the resistance-lowered film is performed by allowing a current to flow through at least a part of the resistance-lowered film.

12. A method of manufacturing an electron source, the electron source being composed of a plurality of electron-emitting devices, wherein the electron-emitting devices are each manufactured through a method in accordance with any one of claims 1 to 11.

13. A method of manufacturing an image forming apparatus, the image forming apparatus being composed of: an electron source having a plurality of electron-emitting devices; and an image forming member, wherein the electron source is manufactured through a method in accordance with claim 12.

* * * * *

UNITED STATES PATENT AND TRADEMARK OFFICE
CERTIFICATE OF CORRECTION

PATENT NO. : 6,988,922 B2
APPLICATION NO. : 10/260557
DATED : January 24, 2006
INVENTOR(S) : Takashi Iwaki It is certified that error appears in the above-identified patent and that said Letters Patent is hereby corrected as shown below:

Column 20, line 1, claim 1, replace “patterned polymer film” with -- polymer film, patterned by the pattering, --.

Column 20, line 2, claim 1, replace “ a resistance-lowered” with --an electrically conductive carbon polymer --.

Column 20, line 3, claim 1, replace “resistance-lowered” with -- electrically conductive carbon polymer --.

Column 20, line 25, claim 6, replace “patterned polymer film” with -- polymer film, patterned by the patterning, --.

Column 20, line 30, claim 7, replace “patterned polymer film” with -- polymer film, patterned by the patterning--.

Column 20, line 34, claim 8, replace “patterned polymer film” with -- polymer film, patterned by the patterning --.

Column 20, line 38, claim 9, replace “patterned polymer film” with -- polymer film, patterned by the patterning --.

Column 20, line 42, claim 10, replace “patterned polymer film” with -- polymer film, patterned by the patterning --.

Column 20, line 45, claim 11, replace “resistance-lowered” with -- electrically conductive carbon polymer --.

Column 20, line 46, claim 11, delete “resistance-”.

Column 20, line 47, claim 11, replace “lowered” with -- electrically conductive carbon polymer --.

Column 20, line 54, claim 13, after “composed of”, delete the colon.

UNITED STATES PATENT AND TRADEMARK OFFICE

CERTIFICATE OF CORRECTION

PATENT NO. : 6,988,922 B2
APPLICATION NO. : 10/260557
DATED : January 24, 2006
INVENTOR(S) : Takashi Iwaki It is certified that error appears in the above-identified patent and that said Letters Patent is hereby corrected as shown below:

Column 20, line 56, claim 13, after "devices", replace the semicolon with a comma.

Signed and Sealed this

Thirteenth Day of November, 2007

JON W. DUDAS
*Director of the United States Patent and Trademark Office*

UNITED STATES PATENT AND TRADEMARK OFFICE

CERTIFICATE OF CORRECTION

PATENT NO. : 6,988,922 B2
APPLICATION NO. : 10/260557
DATED : January 24, 2006
INVENTOR(S) : Takashi Iwaki It is certified that error appears in the above-identified patent and that said Letters Patent is hereby corrected as shown below:

Column 20, line 1, claim 1, replace “patterned polymer film” with -- polymer film, patterned by the pattering, --.

Column 20, line 2, claim 1, replace “a resistance-lowered” with -- an electrically conductive carbon polymer --.

Column 20, line 3, claim 1, replace “resistance-lowered” with -- electrically conductive carbon polymer --.

Column 20, line 25, claim 6, replace “patterned polymer film” with -- polymer film, patterned by the patterning, --.

Column 20, line 30, claim 7, replace “patterned polymer film” with -- polymer film, patterned by the patterning --.

Column 20, line 34, claim 8, replace “patterned polymer film” with -- polymer film, patterned by the patterning --.

Column 20, line 38, claim 9, replace “patterned polymer film” with -- polymer film, patterned by the patterning --.

Column 20, line 42, claim 10, replace “patterned polymer film” with -- polymer film, patterned by the patterning --.

Column 20, line 45, claim 11, replace “resistance-lowered” with -- electrically conductive carbon polymer --.

Column 20, line 46, claim 11, delete “resistance-” .

Column 20, line 47, claim 11, replace “lowered” with -- electrically conductive carbon polymer -- .

Column 20, line 54, claim 13, after “composed of”, delete the colon.

UNITED STATES PATENT AND TRADEMARK OFFICE

CERTIFICATE OF CORRECTION

PATENT NO. : 6,988,922 B2
APPLICATION NO. : 10/260557
DATED : January 24, 2006
INVENTOR(S) : Takashi Iwaki It is certified that error appears in the above-identified patent and that said Letters Patent is hereby corrected as shown below:

Column 20, line 56, claim 13, after “devices”, replace the semicolon with a comma.

Signed and Sealed this

Eleventh Day of December, 2007

JON W. DUDAS
*Director of the United States Patent and Trademark Office*